United States Patent
King et al.

(10) Patent No.: US 11,100,824 B2
(45) Date of Patent: Aug. 24, 2021

(54) VIDEO DISPLAY CAP FOR PARKING PAY STATION

(71) Applicant: IPS Group Inc., San Diego, CA (US)

(72) Inventors: David William King, Rancho Santa Fe, CA (US); Alexander Schwarz, San Diego, CA (US); Chad P. Randall, San Diego, CA (US)

(73) Assignee: IPS GROUP INC., San Diego, CA (US)

( * ) Notice: Subject to any disclaimer, the term of this patent is extended or adjusted under 35 U.S.C. 154(b) by 46 days.

(21) Appl. No.: 15/969,224

(22) Filed: May 2, 2018

(65) Prior Publication Data

US 2018/0322534 A1   Nov. 8, 2018

Related U.S. Application Data

(60) Provisional application No. 62/502,486, filed on May 5, 2017.

(51) Int. Cl.
| | |
|---|---|
| *G06Q 30/02* | (2012.01) |
| *G07F 17/24* | (2006.01) |
| *G09F 23/00* | (2006.01) |
| *G06F 1/16* | (2006.01) |
| *G07B 15/02* | (2011.01) |

(52) U.S. Cl.
CPC ............ *G09F 23/00* (2013.01); *G06F 1/1605* (2013.01); *G06Q 30/0241* (2013.01); *G07F 17/248* (2013.01); *G06Q 30/0268* (2013.01); *G07B 15/02* (2013.01); *G09F 2023/0008* (2013.01)

(58) Field of Classification Search
CPC ...................................... G06Q 30/02–30/0277
See application file for complete search history.

(56) References Cited

U.S. PATENT DOCUMENTS

| | | | |
|---|---|---|---|
| 4,310,890 A | 1/1982 | Trehn et al. | |
| 4,460,965 A | 7/1984 | Trehn et al. | |
| 5,201,396 A | 4/1993 | Chalabian et al. | |
| 5,642,119 A | 6/1997 | Jacobs et al. | |
| D388,227 S | 12/1997 | Dallman | |
| 5,710,743 A * | 1/1998 | Dee .......................... | G07F 17/24 |
| | | | 194/217 |

(Continued)

OTHER PUBLICATIONS

Advertising Auto Pay Station with Parking Flap Solutions. COMA . [retrieved from internet archive on Apr. 24, 2021, archived on Dec. 24, 2016]. <URL: https://web.archive.org/web/20161224022640/http://www.coma-carparking.com/auto-pay-station/advertising-autopay-station-with-parking-flap.html> (Year: 2016).*

(Continued)

*Primary Examiner* — Bion A Shelden
(74) *Attorney, Agent, or Firm* — Wilson Sonsini Goodrich & Rosati

(57) ABSTRACT

Disclosed are parking pay stations, media display caps for parking pay stations, parking pay station advertising platforms including a housing, wherein at least one side of the housing comprises at least one transparent window and at least one media display screen visible through the window, wherein the media display screen is configured to display media to parking users and others, including pedestrians. Also disclosed are methods of retrofitting existing parking pay stations to upgrade them to include media display capability.

15 Claims, 22 Drawing Sheets

(56) References Cited

U.S. PATENT DOCUMENTS

| | | | |
|---|---|---|---|
| D400,684 S | 11/1998 | Dallman | |
| 5,903,520 A | 5/1999 | Dee et al. | |
| D423,181 S | 4/2000 | Dallman | |
| D423,755 S | 4/2000 | Ha | |
| 6,505,774 B1* | 1/2003 | Fulcher | G06Q 30/0284 |
| | | | 235/379 |
| 6,812,857 B1 | 11/2004 | Kassab et al. | |
| 6,823,317 B1* | 11/2004 | Ouimet | G07B 15/02 |
| | | | 705/13 |
| 6,885,311 B2 | 4/2005 | Howard et al. | |
| 7,023,360 B2 | 4/2006 | Staniszewski et al. | |
| 7,783,530 B2 | 8/2010 | Slemmer et al. | |
| D624,274 S | 9/2010 | Pendleton et al. | |
| D735,437 S | 7/2015 | Randall et al. | |
| D735,438 S | 7/2015 | Randall et al. | |
| D735,440 S | 7/2015 | Randall et al. | |
| D735,963 S | 8/2015 | Randall et al. | |
| D735,965 S | 8/2015 | Randall et al. | |
| D795,523 S | 8/2017 | King et al. | |
| D802,874 S | 11/2017 | King et al. | |
| D802,875 S | 11/2017 | King et al. | |
| D802,876 S | 11/2017 | King et al. | |
| D802,877 S | 11/2017 | King et al. | |
| D802,878 S | 11/2017 | King et al. | |
| D813,059 S | 3/2018 | MacKay et al. | |
| 2003/0010821 A1* | 1/2003 | Silberberg | G06Q 20/127 |
| | | | 235/382 |
| 2004/0254840 A1 | 12/2004 | Slemmer et al. | |
| 2005/0226201 A1 | 10/2005 | McMillin et al. | |
| 2006/0136131 A1 | 6/2006 | Dugan et al. | |
| 2007/0040449 A1 | 2/2007 | Spurlin et al. | |
| 2007/0276724 A1 | 11/2007 | Catt et al. | |
| 2008/0052254 A1 | 2/2008 | Al Amri et al. | |
| 2011/0060653 A1* | 3/2011 | King | G06Q 30/02 |
| | | | 705/14.58 |
| 2011/0204847 A1* | 8/2011 | Turner | B60L 11/1816 |
| | | | 320/109 |
| 2011/0213656 A1* | 9/2011 | Turner | B60L 53/14 |
| | | | 705/14.49 |
| 2012/0185325 A1* | 7/2012 | Shani | G06Q 30/0244 |
| | | | 705/14.43 |
| 2012/0285790 A1* | 11/2012 | Jones | G07B 15/02 |
| | | | 194/217 |
| 2013/0124320 A1* | 5/2013 | Karner | G06Q 10/02 |
| | | | 705/14.54 |
| 2014/0214499 A1* | 7/2014 | Hudson | G07B 15/02 |
| | | | 705/13 |
| 2015/0356604 A1* | 12/2015 | Kim | G06Q 30/0261 |
| | | | 705/14.58 |
| 2015/0371483 A1 | 12/2015 | Sun et al. | |
| 2017/0034600 A1 | 2/2017 | King et al. | |
| 2017/0083043 A1 | 3/2017 | Bowers et al. | |
| 2017/0213262 A1* | 7/2017 | Kelley, II | G06Q 30/0284 |
| 2018/0225908 A1* | 8/2018 | MacKay | G07F 17/24 |

OTHER PUBLICATIONS

Revolution Pay Station Upgrades Kits. IPS Group. [retrieved from internet archive on Apr. 24, 2021, archived on Apr. 29, 2016]. <URL: https://web.archive.org/web/20160429200750/https://www.ipsgroupinc.com/products/pay-station-upgrade-kits/> (Year: 2016).*

Ulster University. SKIDATA. [retrieved from internet archive on Apr. 24, 2021, archived on Jul. 20, 2017]. <URL: https://web.archive.org/web/20170720033807/https://www.skidata.com/fileadmin/Assets/downloads/references/parking/hotels/rfs-Ulster_University_en.pdf> (Year: 2017).*

Co-pending U.S. Appl. No. 29/602,232, filed Apr. 28, 2017.
Co-pending U.S. Appl. No. 29/602,237, filed Apr. 28, 2017.
Co-pending U.S. Appl. No. 29/602,239, filed Apr. 28, 2017.
Co-pending U.S. Appl. No. 29/602,240, filed Apr. 28, 2017.
Co-pending U.S. Appl. No. 29/602,241, filed Apr. 28, 2017.
Co-pending U.S. Appl. No. 29/602,934, filed May 4, 2017.

* cited by examiner

A     B

A      B

A          B          C

A          B

A   B

A           B

A        B

A B C

VIDEO DISPLAY CAP FOR PARKING PAY STATION

CROSS-REFERENCE TO RELATED APPLICATION

This application claims the benefit of U.S. Provisional Patent Application No. 62/502,486, filed on May 5, 2017, which is entirely incorporated herein by reference.

BACKGROUND OF THE INVENTION

Parking pay stations are automated parking vending machines that manage multiple parking spaces, typically in garages, parking lots, and on the street. Numerous parking pay stations are currently in use around the world and many additional parking pay stations will be installed in the coming years.

SUMMARY OF THE INVENTION

Currently, parking pay stations are designed for a single, dedicated function—vending rights to park in managed parking spaces. While many parking pay stations are installed in prominent locations in densely-populated and highly-traveled urban centers, they are not configured to provide dual- or multi-use functionalities that leverage their installation locations. Moreover, parking users often directly interact with parking pay stations, but many are positioned such that they are in proximity to, and within view of, roads, sidewalks, walkways, storefronts, and parks, where pedestrians are plentiful.

The parking pay stations and video display caps for parking pay stations described herein offer several improvements over existing technologies. First, the subject matter described herein includes media display capability, including video display capability. Second, the subject matter described herein includes sensors that contribute to identification of parking users and pedestrians. Third, the subject matter described herein includes connectivity to advertising networks to allow delivery of targeted advertising. Importantly, the subject matter described herein allows for display of advertising media, including video media, selected specifically for multiple users. In single screen embodiments, the subject matter described herein can display media for multiple users by timing the display of different media. In multi-screen embodiments, the subject matter described herein can display media for multiple users by displaying different media on different screens. Moreover, the video display caps upgrade, by retrofit (with or without an adapter), existing parking pay stations, thus adding utility and commercial value to current infrastructure.

In one aspect, disclosed herein are parking pay station media display caps comprising: a housing comprising a top and four sides forming an interior open at the bottom, at least one side of the housing comprising at least one transparent window; a network communications element configured to receive media via the network; and at least one media display screen positioned in the interior and visible through the window, the media display screen configured to display the media received via the network. In some embodiments, the media is video. In further embodiments, the video is high-definition (HD) video. In some embodiments, the parking pay station media display cap comprises two media display screens. In further embodiments, the media display screens comprise a first media display screen configured to display media to a parking user and a second media display screen configured to display media to pedestrians. In other embodiments, the media display screens comprise first and second media display screens configured to display media to pedestrians. In some embodiments, the parking pay station media display cap comprises three media display screens. In further embodiments, the media display screens comprise a first media display screen configured to display media to a parking user and second and third media display screens configured to display media to pedestrians. In some embodiments, the parking pay station media display cap further comprises an adapter on a bottom surface of the media display cap configured to interface between the media display cap and a parking pay station. In further embodiments, the adaptor is removable. In some embodiments, the housing is weather- and vandalism-resistant. In some embodiments, the housing is graffiti-resistant. In some embodiments, the parking pay station media display cap further comprises one or more sensors. In further embodiments, the one or more sensors comprise a camera, a vehicle sensor, a pedestrian sensor, or a combination thereof. In some embodiments, the parking pay station media display cap further comprises at least one solar cell.

In some embodiments, the one or more sensors detect vehicles, including collecting occupancy data from selected parking spaces. In some embodiments, the occupancy data collected comprise the number of parking spaces occupied, the number of parking spaces still vacant, and/or the parking time expected or having been paid for each parking occupied parking space. In some embodiments, the collected occupancy data are communicated to one or more remote servers or to a cloud computing system or other computing services. In some embodiments, the sensor that collects the occupancy data is a vehicle sensor.

In some embodiments, the one or more sensors collect traffic data from selected streets within the detection range of each individual sensor. In some embodiments, the sensor detects the number of vehicles passing a specific position on the street within a previously determined time window. In some embodiments, the sensor detects the number of vehicles passing an intersection between changes of the traffic light signals. In some cases, the sensor detects the length of time of a vehicle remaining on or near the same position on the street, e.g., the length of time for a vehicle to move about 5 meters on the street. In some embodiments, the collection of the traffic data can be periodical, e.g., every ten minutes or hourly, during the peak time, e.g., during special events or rush hours, in real-time, upon a command by a manager, e.g., in an emergency. In some embodiments, the collected traffic data are communicated to one or more remote servers or to a cloud computing system or other computing services. In some embodiments, the sensor that collects the traffic data is a vehicle sensor. In some embodiments, the sensor that collects the traffic data is a camera.

In some embodiments, the one or more sensors collect pedestrian data from selected streets or parking lots within the detection range of each individual sensor. In some embodiments, the pedestrian is a viewer of the advertising displayed by the parking pay station. In some embodiments, the sensor detects the number of pedestrians passing a specific position on the street within a previously determined time window. In some embodiments, the sensor detects the number of pedestrians walking over a crossing on the street between changes of the traffic light signals. In some cases, the sensor detects the length of time of a pedestrian remaining on or near the same position on the street, e.g., the length of time for a pedestrian to move about 4 meters on the street. In some embodiments, the sensor, e.g., a camera, detects a viewer, e.g., the user of the parking space or a pedestrian, who watches the advertising displayed on the sensor-enabled parking pay stations. In some embodiments, the sensor detects how long the viewer watches the displayed advertising. In some embodiments, the sensor detects whether the viewer stops watching the displayed advertising when the media display changes to a different advertising or when the viewer, e.g. a diver, stops filling up his vehicle. In some embodiments, the sensor detects the characteristics of or associated with the viewer/pedestrian, e.g., a facial picture of the viewer/pedestrian, the language used by the viewer/pedestrian, the vehicle driven by the viewer/pedestrian, the means to pay for the gas by the viewer/pedestrian, whether the viewer/pedestrian smokes, whether the viewer/pedestrian uses a Bluetooth device, etc. In some embodiments, the collection of the pedestrian data can be periodical, e.g., every ten minutes or hourly, during the peak time, e.g., during special events or rush hours, in real-time, upon a command by a manager, e.g., in an emergency. In some embodiments, the collected pedestrian data are communicated to one or more remote servers or to a cloud computing system or service. In some embodiments, the sensor that collects the pedestrian data is a vehicle sensor. In some embodiments, the sensor that collects the pedestrian data is a camera. In some embodiments, the sensor that collects the pedestrian data is a sound sensor. In some embodiments, the sensor that collects the pedestrian data is an environmental sensor.

In some embodiments, the one or more sensors comprise a sensor detecting or measuring the presence of a Bluetooth device. The Bluetooth device is a personal mobile device, a cell phone, or smart phone. In some embodiments, the sensor detecting or measuring the presence of a Bluetooth device interacts with the detected Bluetooth device within a predetermined range of the parking pay station, e.g., within 10 meters. In some embodiments, the sensor detecting or measuring the presence of a Bluetooth device detects the number of Bluetooth devices within a predetermined range of the parking pay station, e.g., within 20 meters. In some embodiments, after the sensor detecting or measuring the presence of a Bluetooth device detects a Bluetooth device, the parking pay station or the media display cap associated with the sensor interacts with the Bluetooth device, including a personal mobile device such as a cell phone or smart phone. In some embodiments, the personal mobile device is that of a parking user or that of a pedestrian/viewer who watches the advertising. In some embodiments, the parking pay station interacts with a detected Bluetooth device inside or associated with a vehicle, when the vehicle is parked in the proximity of the parking pay station or is driving within a predetermined range of the parking pay station, e.g., within 20 meters. In some embodiments, the parking pay station interacts with a detected Bluetooth device by sending information to or receiving information from the Bluetooth device.

In some embodiments, the data collected from one more sensors, comprising a camera, a vehicle sensor, a pedestrian sensor, an environmental sensor, or a combination thereof, are combined and analyze to determine the reactions/behaviors of an average pedestrian/viewer after watching one or more pieces of advertisement. In further embodiments, the data collected are combined and analyze to determine which advertisement among a plurality of similar advertisements elicits more favorable response from an average pedestrian/viewer. In some embodiments, the data collected are combined and analyze to determine the ranking of popularity of a plurality of similar advertisements among average pedestrians/viewers. In some embodiments, the data collected are combined and analyze to determine or predict the possible preference for a pedestrian/viewer having one or more specific characteristics when watching a plurality of advertisements. In some embodiments, the data collected are combined and analyze to determine or predict which advertisement would elicit favorable response from a pedestrian/viewer having one or more specific characteristics when watching a plurality of advertisements. In some embodiments, the specific characteristics of a pedestrian/viewer are those that can be detected by the one or more sensors. In some embodiments, the data collected are combined and analyzed to determine the appropriate parking rate for one or more parking lots. In some embodiments, the parking rate for one or more parking lots is determined based on the occupancy data, the traffic data, the pedestrian data, the data of detected Bluetooth devices, or a combination thereof. In some embodiments, the parking rate for one or more parking lots is determined based on predictions made from previously collected data or calculated trends. In some embodiments, the parking rate for one or more parking lots is determined based on predictions based on both previously collected data and currently collected data. In some embodiments, the sensor detects vehicles installed with and operated by semi-autonomous driving systems or driving system. In some embodiments, after detecting such vehicles having self-driving or assisted-driving capabilities, the sensor establishes contacts with the wireless devices of the driver of such vehicles and provides information, including advertisement, to the driver. In some embodiments, the sensor after detecting the wireless capability of a device of a driver/viewer/pedestrian interacts with the wireless device of the driver/viewer/pedestrian via wireless protocols. In some embodiments, the sensor after detecting the wireless capability of a vehicle driven by a driver interacts with the wireless component of the vehicle via wireless protocols. In some embodiments, the data collected are sent to a third party, in real time or at pre-determined intervals. In some embodiment, the third party is a company sending advertising to users.

In another aspect, disclosed herein are disclosed herein a retrofit kit comprising: a media display cap comprising: a housing comprising a top and four sides forming an interior open at the bottom, at least one side of the housing comprising at least one transparent window; a network communications element configured to receive media via the network; at least one media display screen positioned in the interior and visible through the window, the media display screen configured to display the media received via the network; and an adapter on a bottom surface of the media display cap configured to interface between the media display cap and an existing parking meter. In some embodiments, a portion of the existing parking meter is removed or modified to interface with the adapter. In some embodiments, no portion of the existing parking meter is removed or modified to interface with the adapter. In some embodiments, the adaptor is removable. In some embodiments, the retrofit kit further comprises a power supply to power the network communications element and the media display screen. In some embodiments, the retrofit kit further comprises an electrical connector to the existing parking meter to connect to a power supply of the existing parking meter. In some embodiments, the media is video. In further embodiments, the video is high-definition (HD) video. In some embodiments, the media display cap comprises two media display screens. In further embodiments, the media display screens comprise a first media display screen configured to display media to a parking user and a second media display screen configured to display media to pedestrians. In other embodiments, the media display screens comprise first and second media display screens configured to display media to pedestrians. In some embodiments, the media display cap comprises three media display screens. In further embodiments, the media display screens comprise a first media display screen configured to display media to a parking user and second and third media display screens configured to display media to pedestrians. In some embodiments, the housing is weather- and vandalism-resistant. In some embodiments, the housing is graffiti-resistant. In some embodiments, the media display cap further comprises one or more sensors. In further embodiments, the one or more sensors comprise a camera, a vehicle sensor, a pedestrian sensor, an environmental sensor, or a combination thereof. In some embodiments, the media display cap further comprises at least one solar cell.

In another aspect, disclosed herein are parking pay stations comprising: a network communications element configured to receive media via the network; and a media display cap comprising: a housing comprising a top and four sides forming an interior, at least one side of the housing comprising at least one transparent window; and at least one media display screen positioned in the interior and visible through the window, the media display screen configured to display the media received via the network. In some embodiments, the media is video. In further embodiments, the video is high-definition video. In some embodiments, the media display cap comprises two media display screens. In further embodiments, the media display screens comprise a first media display screen configured to display media to a parking user and a second media display screen configured to display media to pedestrians. In other embodiments, the media display screens comprise first and second media display screens configured to display media to pedestrians. In some embodiments, the media display cap comprises three media display screens. In further embodiments, the media display screens comprise a first media display screen configured to display media to a parking user and second and third media display screens configured to display media to pedestrians. In some embodiments, the parking pay station further comprises an adapter on a bottom surface of the media display cap configured to interface between the media display cap and a parking pay station. In further embodiments, the adaptor is removable. In some embodiments, the housing is weather- and vandalism-resistant. In some embodiments, the housing is graffiti-resistant. In some embodiments, the media display cap further comprises one or more sensors. In further embodiments, the one or more sensors comprise a camera, a vehicle sensor, a pedestrian sensor, or a combination thereof. In some embodiments, the media display cap further comprises at least one solar cell.

In another aspect, disclosed herein are parking pay station advertising platforms comprising: a plurality of parking pay stations, each parking pay station comprising: a network communications element configured to receive at least first media and second media via the network; and a media display cap comprising: a housing comprising: a top and four sides forming an interior; a first transparent window in a first side of the housing; and a second transparent window in a second side of the housing; a first media display screen positioned in the interior and visible through the first window, the first media display screen configured to display the first media received via the network; and a second media display screen positioned in the interior and visible through the second window, the second media display screen configured to display the second media received via the network; and a server processor configured to provide a centralized advertising application comprising: a software module identifying a parking user engaged with one of the parking pay stations; a software module determining the first media based on at least the identity of the parking user and transmitting the first media via the network to the parking pay station; and a software module determining the second media based on at least the location of the pay station and transmitting the first media via the network to the parking pay station. In some embodiments, the first media and the second media are video. In further embodiments, the video is high-definition video. In some embodiments, the first media is displayed to the parking user on the first media display screen. In some embodiments, the second media is displayed to pedestrians on the second media display screen. In some embodiments, each parking pay station further comprises one or more sensors. In further embodiments, the one or more sensors comprise a camera, a vehicle sensor, a pedestrian sensor, or a combination thereof. In a particular embodiment, the one or more sensors comprises a camera, the network communications element is further configured to transmit camera data via the network, and the centralized advertising application further comprises a software module performing biometric recognition on the camera data to determine the identity of the parking user. In another particular embodiment, the one or more sensors comprises a camera, the network communications element is further configured to transmit camera data via the network, the centralized advertising application further comprises a software module applying one or more computer vision algorithms to the camera data to determine one or more characteristics of at least one pedestrian, and the second media is further determined based on the one or more characteristics of the at least one pedestrian.

In another aspect, disclosed herein are methods of upgrading a parking pay station, the method comprising: disengaging an upper portion of an existing parking pay station; removing the upper portion; and replacing the upper portion with a media display cap comprising: a housing comprising a top and four sides forming an interior open at the bottom, at least one side of the housing comprising at least one transparent window; a network communications element configured to receive media via the network; and at least one media display screen positioned in the interior and visible through the window, the media display screen configured to display the media received via the network; thereby upgrading the existing parking pay station. In some embodiments, the upper portion of the existing parking pay station is a standard cap. In some embodiments, the upper portion of the existing parking pay station comprises one or more solar cells. In some embodiments, the method further comprises engaging the media display cap with the existing parking pay station. In some embodiments, the media display cap further comprises one or more solar cells. In some embodiments, the media display cap further comprises one or more sensors. In further embodiments, the one or more sensors comprise a camera, a vehicle sensor, a pedestrian sensor, or a combination thereof.

In another aspects disclosed herein is a parking pay station comprising a media display cap comprising: a housing comprising a top and four sides forming an interior open at the bottom, at least one side of the housing comprising at least one transparent window; a network communications element configured to receive media via the network; and at least one media display screen positioned in the interior and visible through the window, the media display screen configured to display the media received via the network.

In another aspects disclosed herein is a parking pay station advertising platform comprising: a plurality of parking pay stations, each parking pay station comprising a media display cap comprising: a housing comprising a top and four sides forming an interior open at the bottom, at least one side of the housing comprising at least one transparent window; a network communications element configured to receive media via the network; and at least one media display screen positioned in the interior and visible through the window, the media display screen configured to display the media received via the network; and a server processor configured to provide a centralized advertising application comprising: a software module identifying a parking user engaged with one of the plurality of parking pay stations; a software module determining the media based and transmitting the media via the network to the media display cap, wherein the media is determined based on at least the identity of the parking user, at least the location of the pay station, or a combination thereof.

BRIEF DESCRIPTION OF THE DRAWINGS

A better understanding of the features and advantages of the present invention will be obtained by reference to the following detailed description that sets forth illustrative embodiments and the accompanying drawings of which.

DETAILED DESCRIPTION OF THE INVENTION

Figure 1:
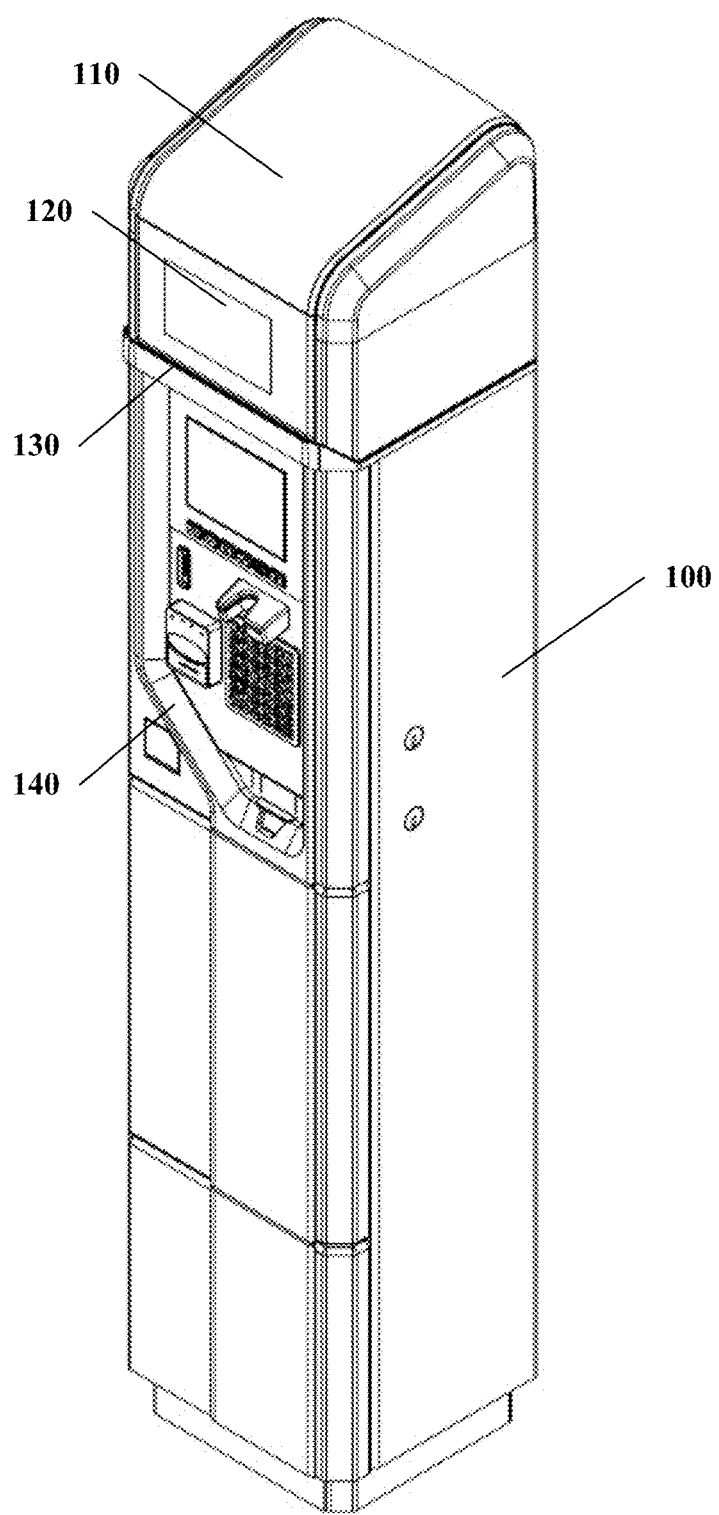
FIG. 1 shows a non-limiting example of parking pay station 100; in this case, an IPS Group MS1 parking pay station including a video display cap with a media display screen on the front of the pay station.

Described herein, in certain embodiments, are parking pay station media display caps comprising: a housing comprising a top and four sides forming an interior open at the bottom, at least one side of the housing comprising at least one transparent window; a network communications element configured to receive media via the network; and at least one media display screen positioned in the interior and visible through the window, the media display screen configured to display the media received via the network.

Also described herein, in certain embodiments, are parking pay stations comprising: a network communications element configured to receive media via the network; and a media display cap comprising: a housing comprising a top and four sides forming an interior, at least one side of the housing comprising at least one transparent window; and at least one media display screen positioned in the interior and visible through the window, the media display screen configured to display the media received via the network.

Also described herein, in certain embodiments, are parking pay station advertising platforms comprising: a plurality of parking pay stations, each parking pay station comprising: a network communications element configured to receive at least first media and second media via the network; and a media display cap comprising: a housing comprising: a top and four sides forming an interior; a first transparent window in a first side of the housing; and a second transparent window in a second side of the housing; a first media display screen positioned in the interior and visible through the first window, the first media display screen configured to display the first media received via the network; and a second media display screen positioned in the interior and visible through the second window, the second media display screen configured to display the second media received via the network; and a server processor configured to provide a centralized advertising application comprising: a software module identifying a parking user engaged with one of the parking pay stations; a software module determining the first media based on at least the identity of the parking user and transmitting the first media via the network to the parking pay station; and a software module determining the second media based on at least the location of the pay station and transmitting the first media via the network to the parking pay station.

Also described herein, in certain embodiments, are methods of upgrading a parking pay station, the method comprising: disengaging an upper portion of an existing parking pay station; removing the upper portion; and replacing the upper portion with a media display cap comprising: a housing comprising a top and four sides forming an interior open at the bottom, at least one side of the housing comprising at least one transparent window; a network communications element configured to receive media via the network; and at least one media display screen positioned in the interior and visible through the window, the media display screen configured to display the media received via the network; thereby upgrading the existing parking pay station.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Parking Pay Station

In some embodiments, the parking pay station media display caps, parking pay stations, parking pay station advertising platforms, and methods described herein include a parking pay station, or use of the same. In some embodiments, a parking pay station includes a video display cap at the time of its manufacture or installation.

In other embodiments, a video display cap is added to an existing parking pay station after its manufacture or installation. In such embodiments, addition of the video display cap upgrades the parking pay station by way of retrofit. In a particular embodiment, an existing upper portion, such as a cap, of an existing parking pay station is removed and replaced with a video display cap to upgrade the parking pay station by way of retrofit. In some embodiments, an adapter is utilized between the existing parking pay station and the video display cap to allow for accurate fitment. In further embodiments, the subject matter described herein includes upgrade or retrofit kits comprising a video display cap and one or more adapters. A wide variety of existing parking pay stations are suitable for upgrade with the video display caps and parking pay station advertising platforms described herein.

In some embodiments, a media display cap described herein is compatible with, and can be retrofitted to, a wide range of existing meters. Further, media display cap is designed such that the internal components other than the media display screen are not visible at all from the outside, thereby protecting the media display cap and the parking meter against possible acts of vandalism. Parking meters or parking pay stations fitted with the media display caps described herein can be serviced easily.

In other embodiments, the present invention provides a convenient upgrade procedure to add media displaying capability to an existing parking meter by requiring only the simple step of installing a media display cap onto an existing meter. In some embodiments, the media display cap described herein is self-contained, having an independent power source and communications element (e.g., network communications element). In further embodiments, the media display cap described herein does not require an electrical connection to an existing meter. For example, in some embodiments, the media display cap is physically associated with an existing meter and optionally in wireless communication with the existing parking meter mechanism, but does not require a functional, wired, electrical connection to any component of the existing meter. This feature facilitates rapid, low-cost upgrades, reduces operating and maintenance costs, and results in a more modular system that is easier to upgrade further in the future. In other embodiments, the video/media displaying cap comprise an electrical connection to an existing meter, including a functional, wired, electrical connection to the power source and/or communications system of the existing parking meter.

In some embodiments, old street parking meters are phased out and replaced by meters that are enabled to display media contents. Replacement and installation of an entirely new unit is costly for cities, municipalities, or other authorities in charge of street parking meters, thereby causing eventual increase in parking rates to recover the cost of purchase and installation. Moreover, replacement and installation of an entirely new unit creates electronic waste. The media display cap described in the present invention, offers a cost effective and environmentally-friendly solution to the problem. The media display cap of the present invention can be easily fitted to existing street parking meters, even those that have previously been upgraded by replacing the internal meter mechanism. These replacements further allow for video/media display cap replacement, upgrades, or additions. Installations of media display capability in existing street meters typically involve excessive road work, drilling, and infrastructure modifications on street lights, utility poles, and underground wiring. The replacement, upgrade, or addition of the media displaying capability using a media display described in the present invention or an upgrade to the media display cap described in the present invention reduces waste, is easier to install, and is cheaper to maintain.

In certain embodiments, the media display cap of the present invention is completely solar powered. Street parking meters that are upgraded using a solar powered media display caps described herein do not need batteries to operate. This feature further reduces the operating cost of the street parking meters that are upgraded with the media displays described herein. In other embodiments, the media display cap is completely battery powered, completely wire powered, and/or optionally solar powered.

Figure 2:
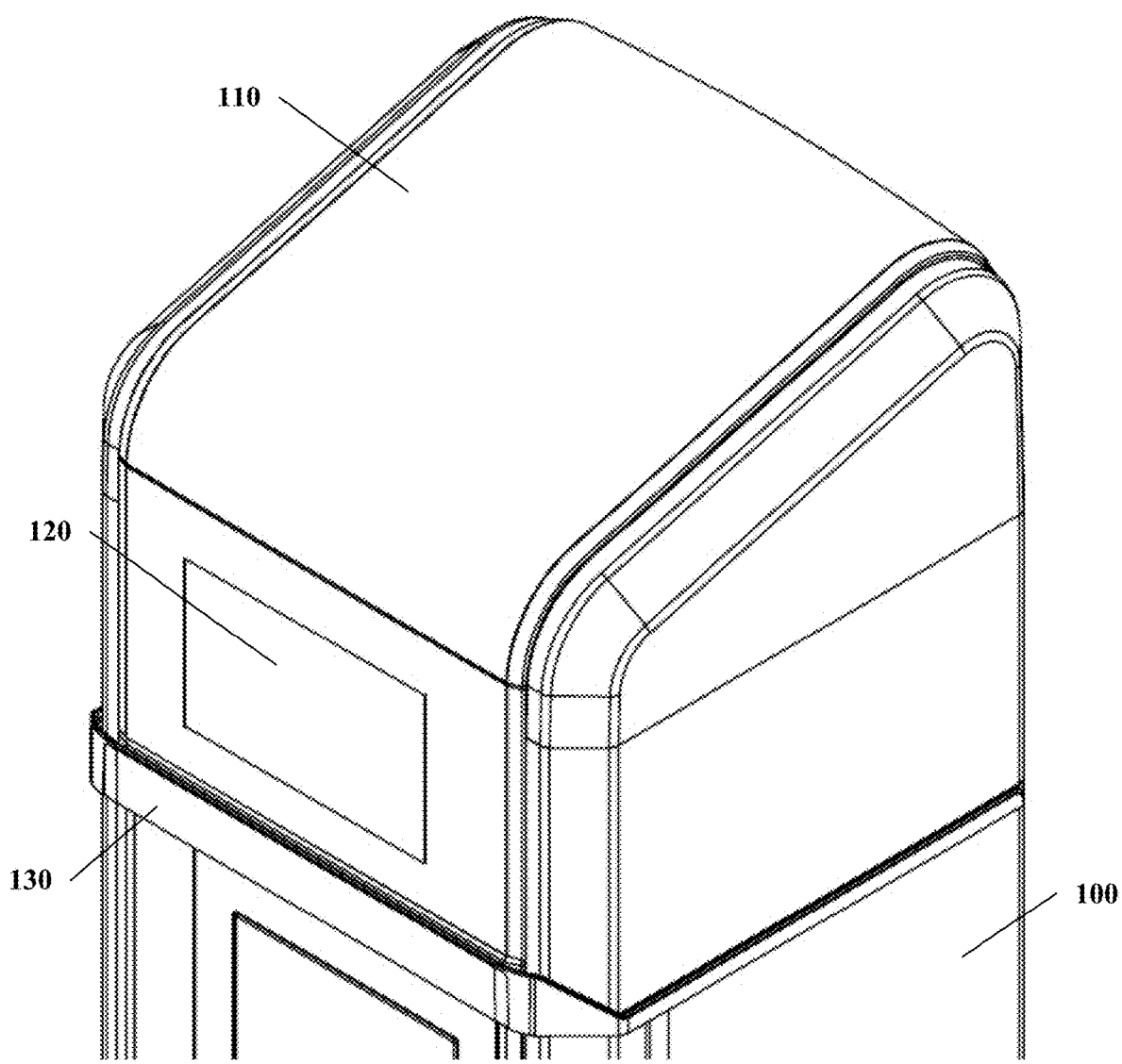
FIG. 2 shows an expanded view of the upper portion of the non-limiting example of parking pay station 100 in FIG. 1.

Referring to FIGS. 1 and 2, in a particular embodiment, a parking pay station 100 comprises a media display cap 110 comprising a media display screen 120 on the front panel of the media display cap 110 facing a parking user when the parking user is using the parking pay station 100 to pay parking fees. The media display cap 110 optionally comprises solar panel, e.g., on the top of media display cap 110. The media display cap 110 optionally comprises an adapter 130 on a bottom surface of media display cap 110. The adapter 130 is configured to interface between the media display cap 110 and a parking meter 140 such that the media display cap 110 can retrofit the parking meter 140 and add video displaying capacity to the parking meter 140. The media display cap 110 optionally comprises one or more sensors comprising a camera, a vehicle sensor, a pedestrian sensor, or a combination thereof. The one or more sensors are described below in more details.

Figure 3:
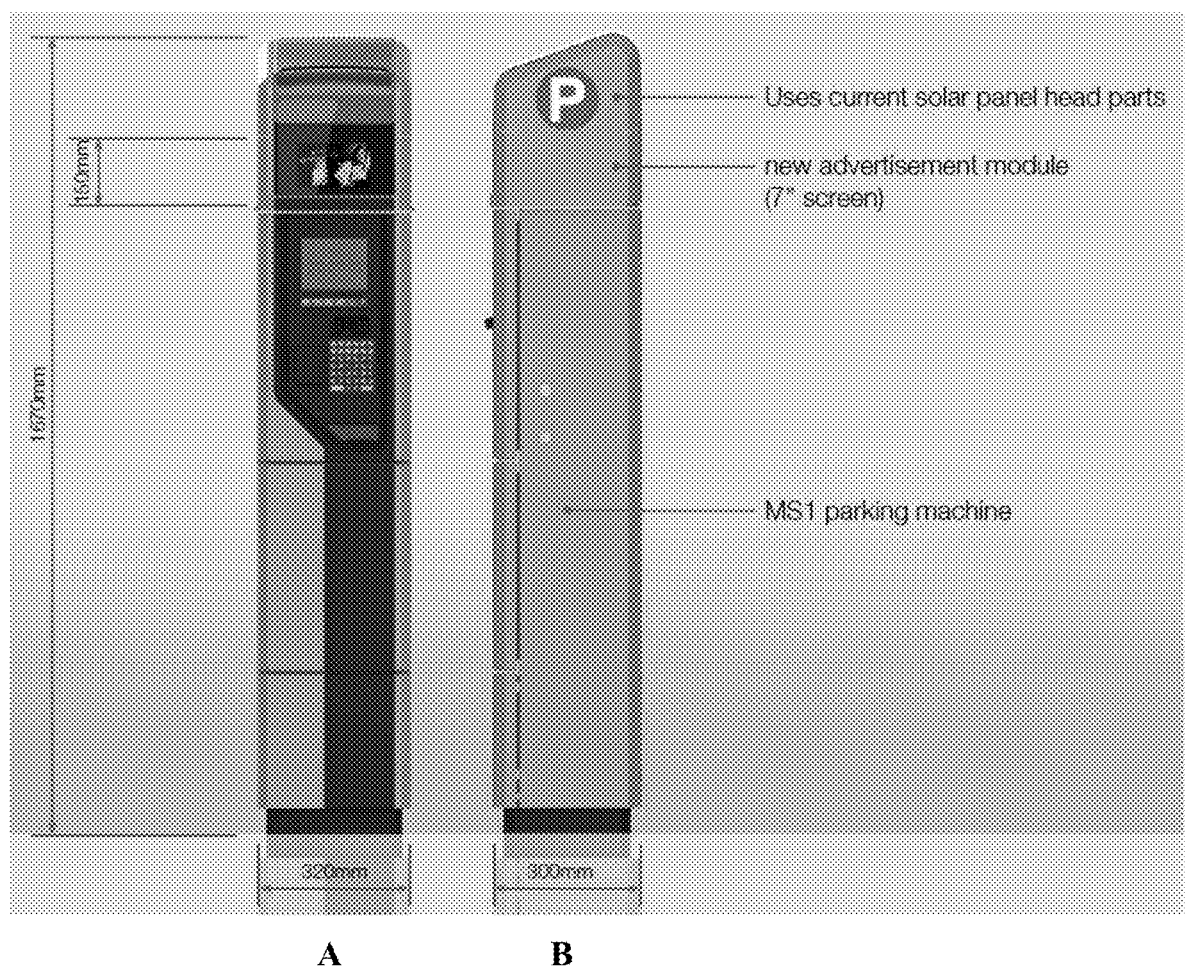
FIG. 3 shows another non-limiting example of a parking pay station.

Referring to FIG. 3, in a particular embodiment, a front view (panel A) and a side view (panel B) of a parking pay station are shown. As shown in panel A, the parking pay station is about 1,670 mm in height. The width of both the media display cap and the parking meter is about 320 mm in width when viewing from the front face of the parking pay station. In addition, the media display screen is about 150 mm in height. As show in panel B, the parking pay station comprises a slanted top surface and the width of the side panel is about 300 mm. The parking pay station optionally comprises a solar panel, e.g., on the slanted top face. The parking pay station optionally comprises a parking sign of "P" on at least one side panel. The media display cap, shown as "new advertisement module" in panel B, comprises a 7" screen as the media display screen. In this particular embodiment, the parking pay station is an MS1 parking machine and the media display screen is facing a parking user when the parking user is using the parking pay station to pay parking fees.

Figure 4:
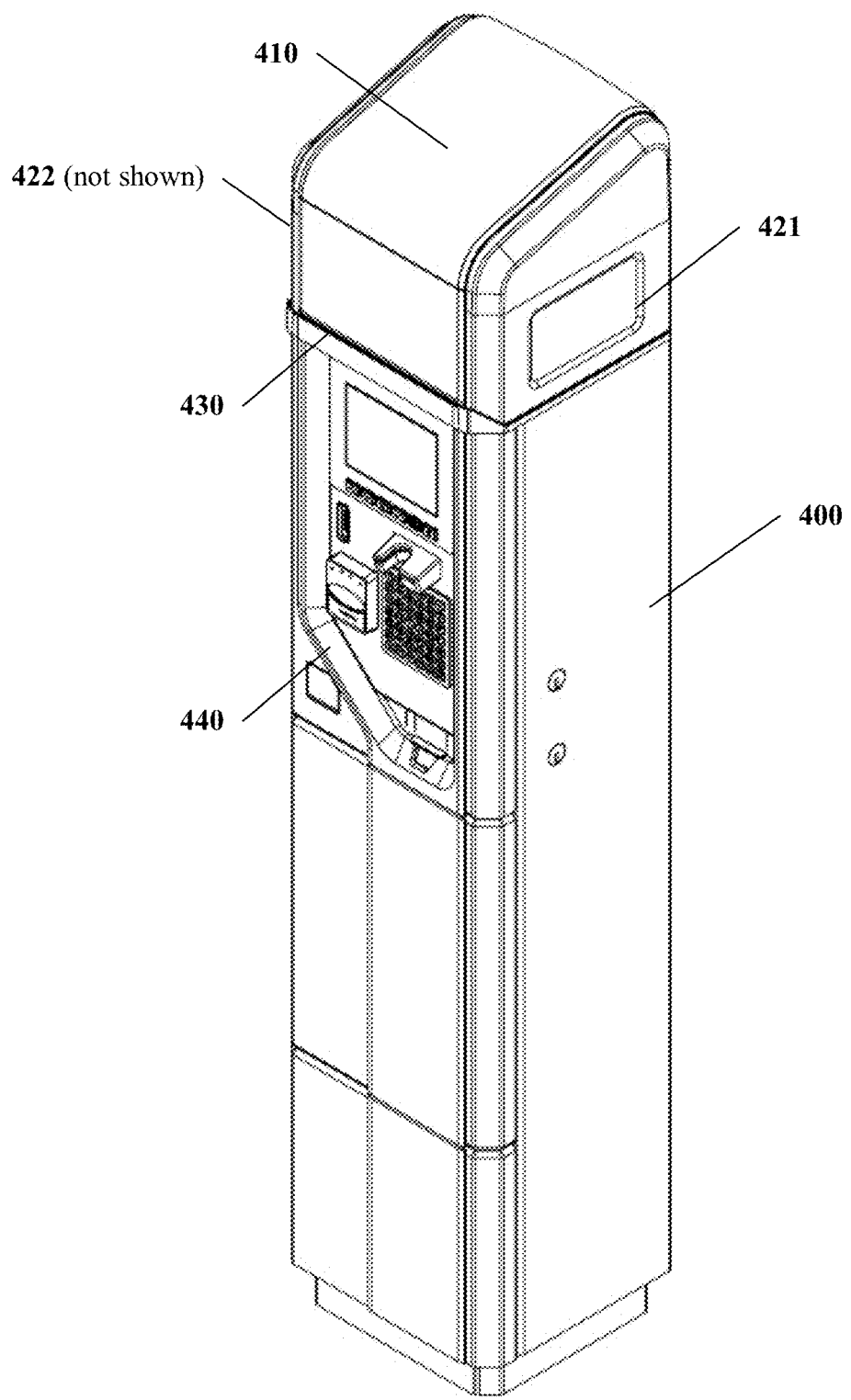
FIG. 4 shows still another non-limiting example of parking pay station 400; in this case, a parking pay station including a video display cap with two media display screens, one on each of the left and right sides of the pay station.
Figure 5:
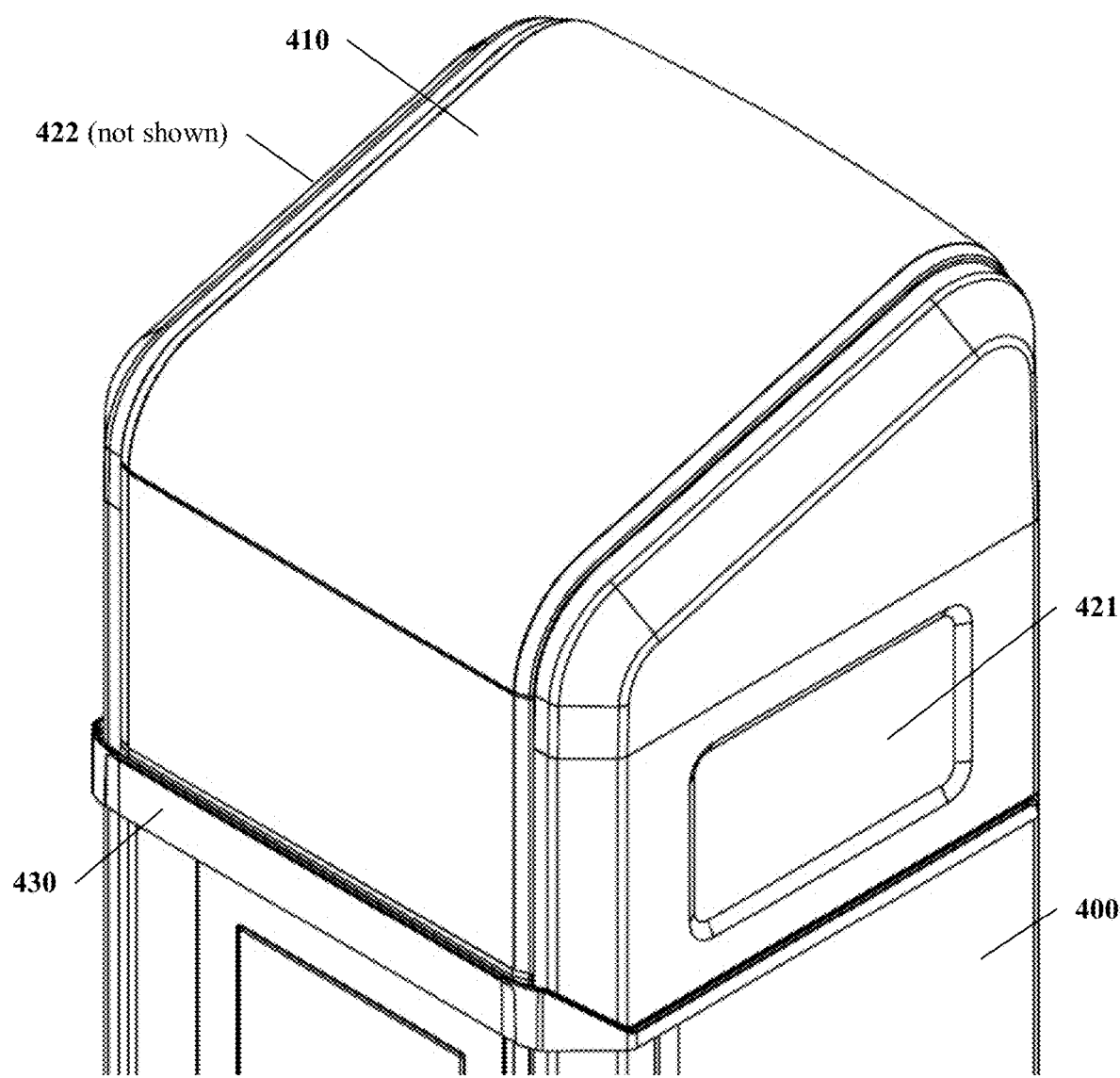
FIG. 5 shows an expanded view of the upper portion of the non-limiting example of parking pay station 400 in FIG. 4.

Referring to FIGS. 4 and 5, in a particular embodiment, a parking pay station 400 comprises a media display cap 410 comprising a media display screen 421 on the right side panel of the media display cap 410 and a media display screen 422 (not shown) on the left side panel of the media display cap 410 when the parking user is facing the front panel of the parking pay station 400 to pay parking fees. The media display cap 410 optionally comprises solar panel, e.g., on the top of media display cap 410. The media display cap 410 optionally comprises an adapter 430 on a bottom surface of media display cap 410. The adapter 430 is configured to interface between the media display cap 410 and a parking meter 440 such that the media display cap 410 can retrofit the parking meter 440 and add video displaying capacity to the parking meter 440. The media display cap 410 optionally comprises one or more sensors comprising a camera, a vehicle sensor, a pedestrian sensor, or a combination thereof. The one or more sensors are described below in more details.

Figure 6:
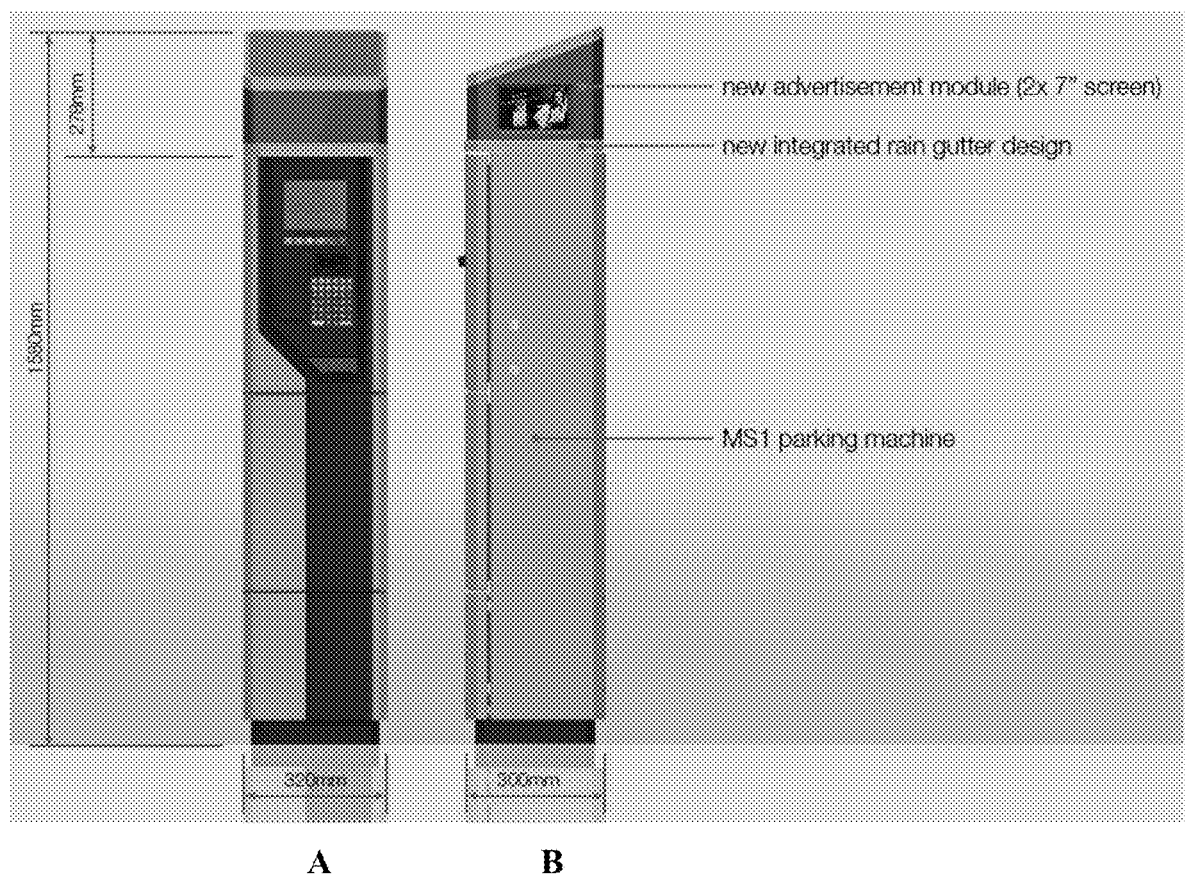
FIG. 6 shows another non-limiting example of a parking pay station.

Referring to FIG. 6, in a particular embodiment, a front view (panel A) and a side view (panel B) of a parking pay station are shown. As shown in panel A, the parking pay station is about 1,580 mm in height. The width of both the media display cap and the parking meter is about 320 mm in width when viewing from the front face of the parking pay station. In addition, the media display cap is about 278 mm in height. There is no media display screen on the front panel of the media display cap. As show in panel B, the parking pay station comprises a slanted top surface and the width of the side panel is about 300 mm. The parking pay station optionally comprises a solar panel, e.g., on the slanted top face. The parking pay station optionally comprises a parking sign of "P" on at least one side panel. The media display cap, shown as "new advertisement module" in panel B, comprises two 7" screens as the media display screens. One of the media display screens is on the right side panel of the media display cap while the other is on the left side panel of the media display cap. In addition, the media display cap comprises an integrated rain gutter design at or near the bottom face of the media display cap such that collected precipitation (rain or snow) can be drained. In some embodiments, the integrated rain gutter design is part of the adapter that is configured to interface between the media display cap and a parking meter so that the parking meter can be retro fit with the media display cap. In this particular embodiment, the parking pay station is an MS1 parking machine and the media display screen is not facing a parking user when the parking user is using the parking pay station to pay parking fees. Rather, the media display screens on the side panels can be viewed by passers-by when a parking user is using the parking pay station to pay parking fees.

Figure 7:
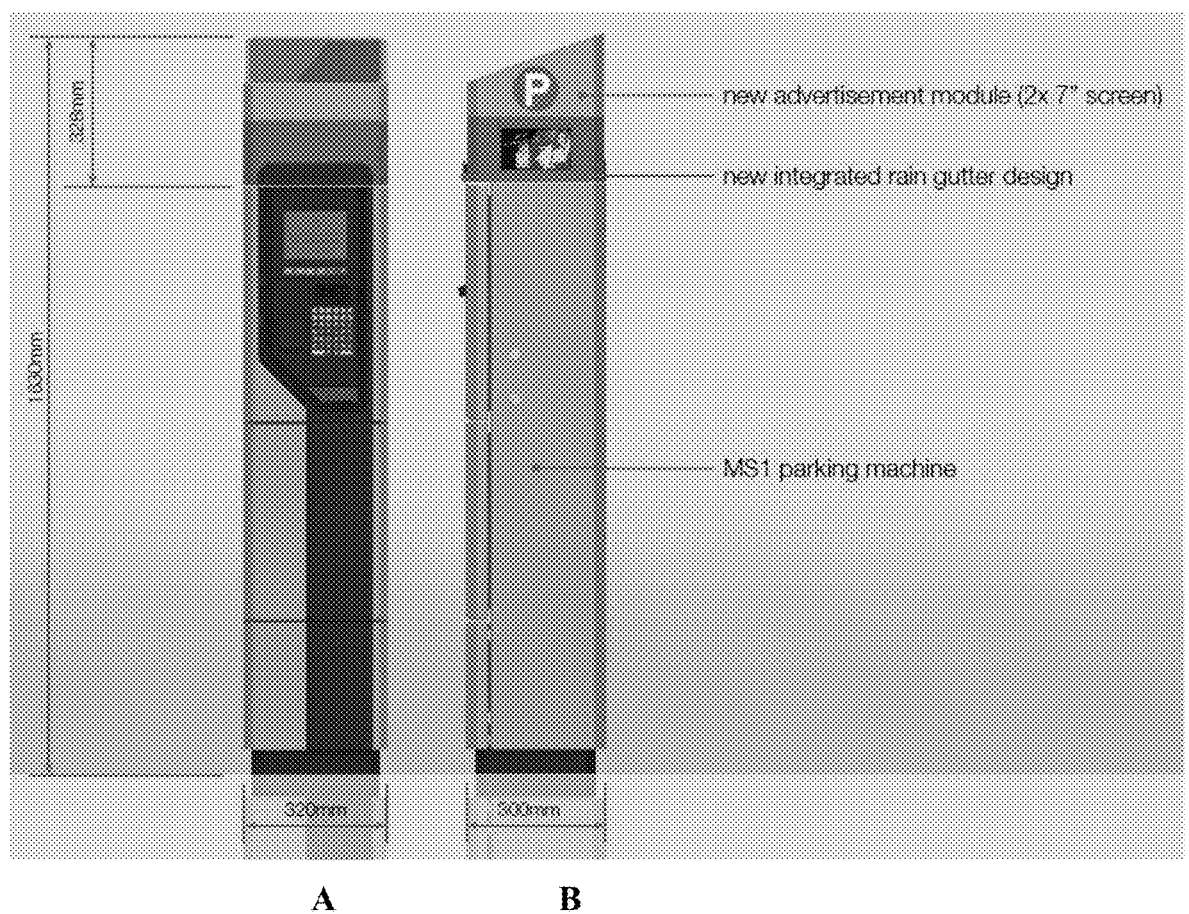
FIG. 7 shows still another non-limiting example of a parking pay station.

Referring to FIG. 7, in a particular embodiment, a front view (panel A) and a side view (panel B) of a parking pay station are shown. As shown in panel A, the parking pay station is about 1,630 mm in height. The width of both the media display cap and the parking meter is about 320 mm in width when viewing from the front face of the parking pay station. In addition, the media display cap is about 328 mm in height. There is no media display screen on the front panel of the media display cap. As show in panel B, the parking pay station comprises a slanted top surface and the width of the side panel is about 300 mm. The parking pay station optionally comprises a solar panel, e.g., on the slanted top face. The parking pay station optionally comprises a parking sign of "P" on at least one side panel. The media display cap, shown as "new advertisement module" in panel B, comprises two 7" screens as the media display screens. One of the media display screens is on the right side panel of the media display cap while the other is on the left side panel of the media display cap. In addition, the media display cap comprises an integrated rain gutter design at or near the bottom face of the media display cap such that collected precipitation (rain or snow) can be drained. In some embodiments, the integrated rain gutter design is part of the adapter that is configured to interface between the media display cap and a parking meter so that the parking meter can be retro fit with the media display cap. In this particular embodiment, the parking pay station is an MS1 parking machine and the media display screen is not facing a parking user when the parking user is using the parking pay station to pay parking fees. Rather, the media display screens on the side panels can be viewed by passers-by when a parking user is using the parking pay station to pay parking fees.

Figure 8:
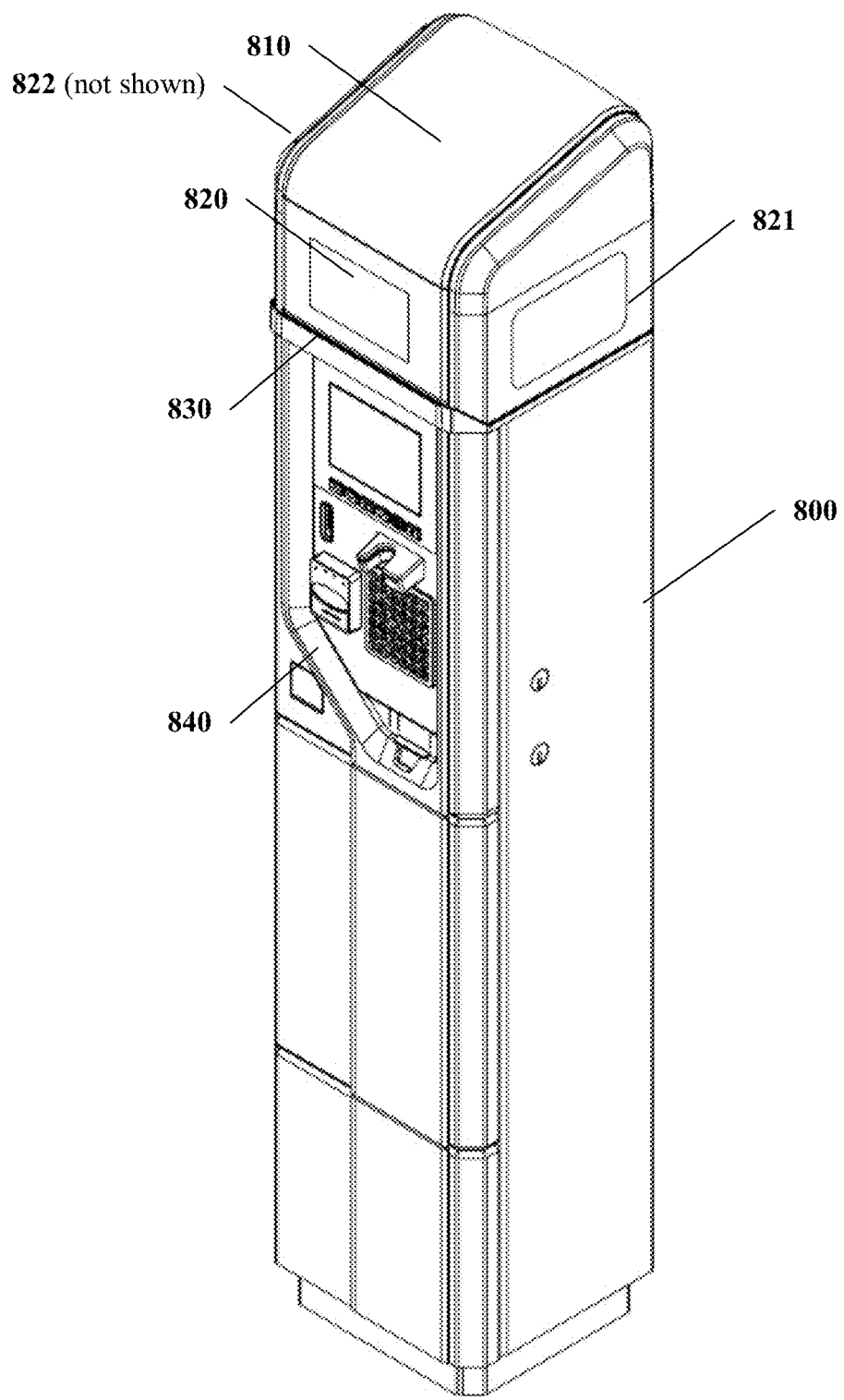
FIG. 8 show a non-limiting example of parking pay station 800; in this case, a parking pay station including a video display cap with three media display screens, one on the front of the pay station, and one of each of the left and right sides of the pay station.
Figure 9:
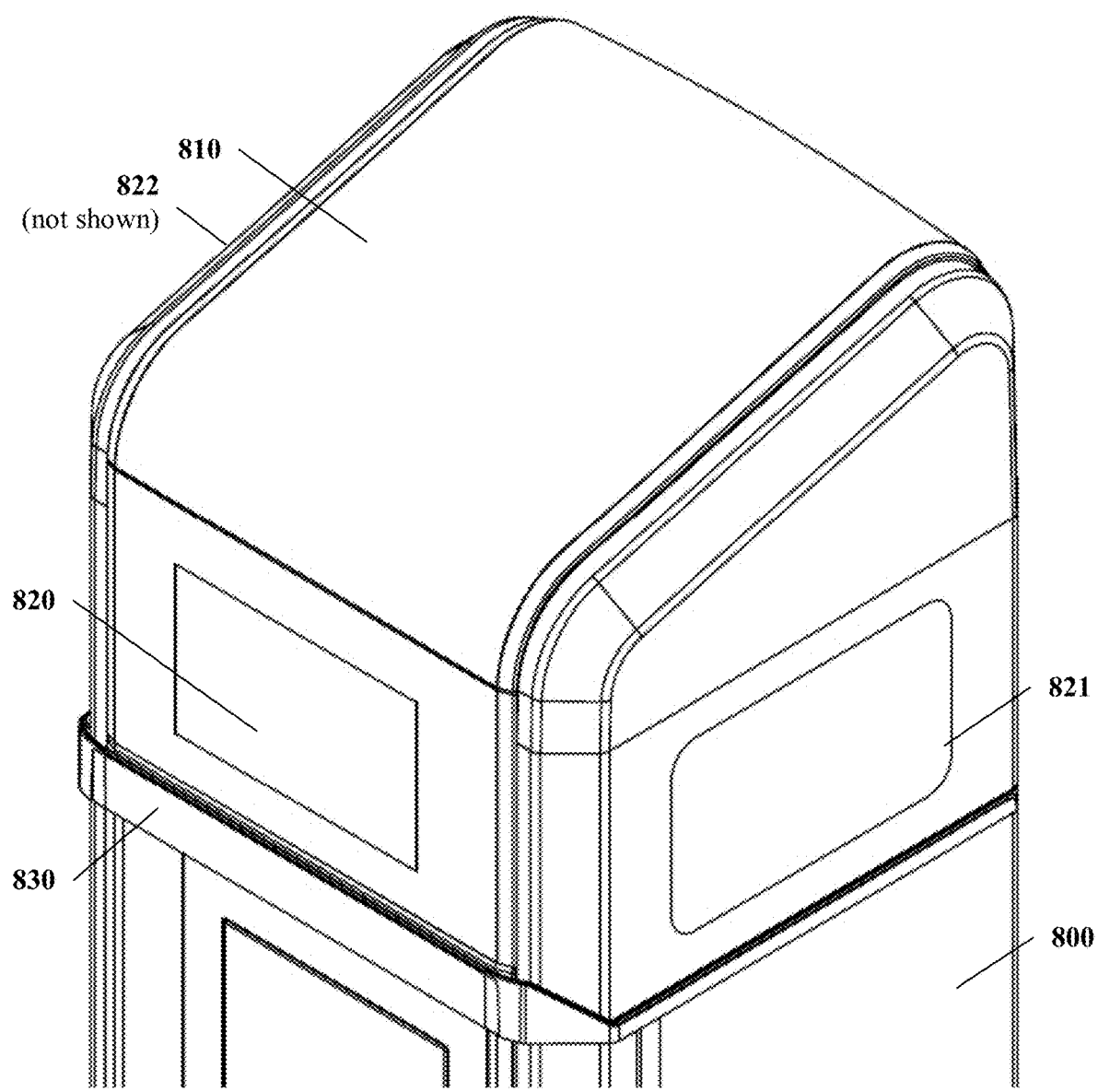
FIG. 9 shows an expanded view of the upper portion of the non-limiting example of parking pay station 800 in FIG. 8.

Referring to FIGS. 8 and 9, in a particular embodiment, a parking pay station 800 comprises a media display cap 810 comprising a media display screen 820 on the front panel of the media display cap 810, a media display screen 821 on the right side panel of the media display cap 810 and a media display screen 822 (not shown) on the left side panel of the media display cap 810 when the parking user is facing the front panel of the parking pay station 800 to pay parking fees. The media display cap 810 optionally comprises solar panel, e.g., on the top of media display cap 810. The media display cap 810 optionally comprises an adapter 830 on a bottom surface of media display cap 810. The adapter 830 is configured to interface between the media display cap 810 and a parking meter 840 such that the media display cap 810 can retrofit the parking meter 840 and add video displaying capacity to the parking meter 840. The media display cap 810 optionally comprises one or more sensors comprising a camera, a vehicle sensor, a pedestrian sensor, or a combination thereof. The one or more sensors are described below in more details.

Figure 10:
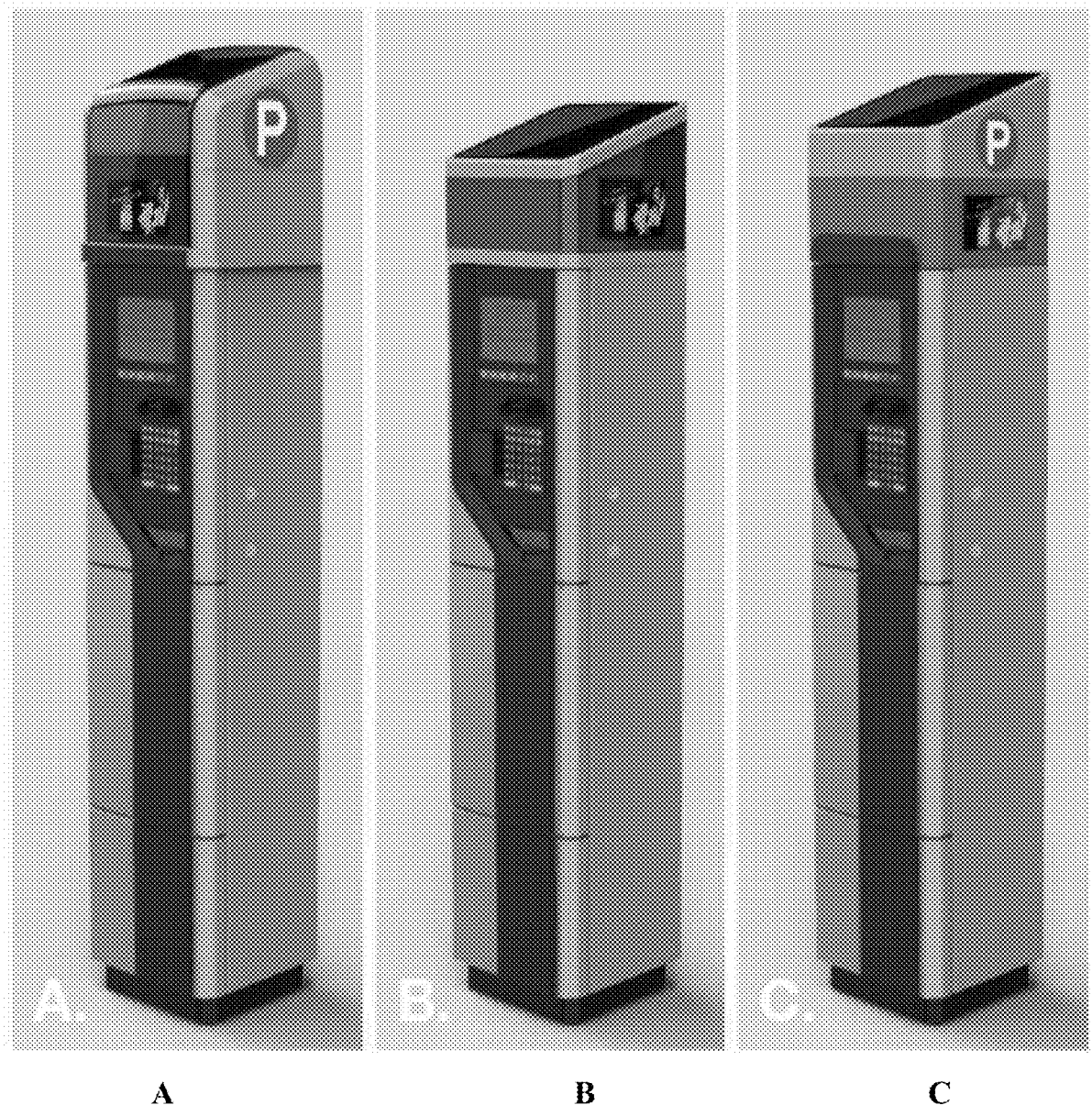
FIG. 10 shows three non-limiting examples of parking pay stations; in these cases, parking pay stations with one or two media display screens and showing alternative configurations.

Referring to FIG. 10, in a particular embodiment, perspective views of three parking pay stations are shown in panels A, B and C. As shown in panel A, the media display cap comprises a curved and slanted top surface, and at least one media display screen on the front panel of the media display cap such that when a parking user is paying parking fees, the parking user can view the contents from the media display screen. The parking pay station also comprises a parking meter underneath and interfaced with the media display cap. As shown in panel B, the media display cap comprises a slanted top surface, and two media display screens (only one is shown) on each of the side panels of the media display cap respectively such that when a parking user is paying parking fees, a passer-by can view the contents from the media display screen without being blocked by the parking user. The parking pay station also comprises a parking meter underneath and interfaced with the media display cap. As shown in panel C, the media display cap comprises a slanted top surface, a symbol of "P" to indicate parking on at least one side panel of the parking pay station, and two media display screens (only one is shown) on each of the side panels of the media display cap respectively such that when a parking user is paying parking fees, a passer-by can view the contents from the media display screen without being blocked by the parking user. The parking pay station also comprises a parking meter underneath and interfaced with the media display cap. In addition, the parking pay station can have various sizes in height and width, different designs for the adapter configured to interface between the media display cap and a parking meter so that the parking meter can be retro fit with the media display cap, and different designs for the integrated rain gutter design at or near the bottom face of the media display cap such that collected precipitation (rain or snow) can be drained, as shown in FIG. 10.

Figure 11:
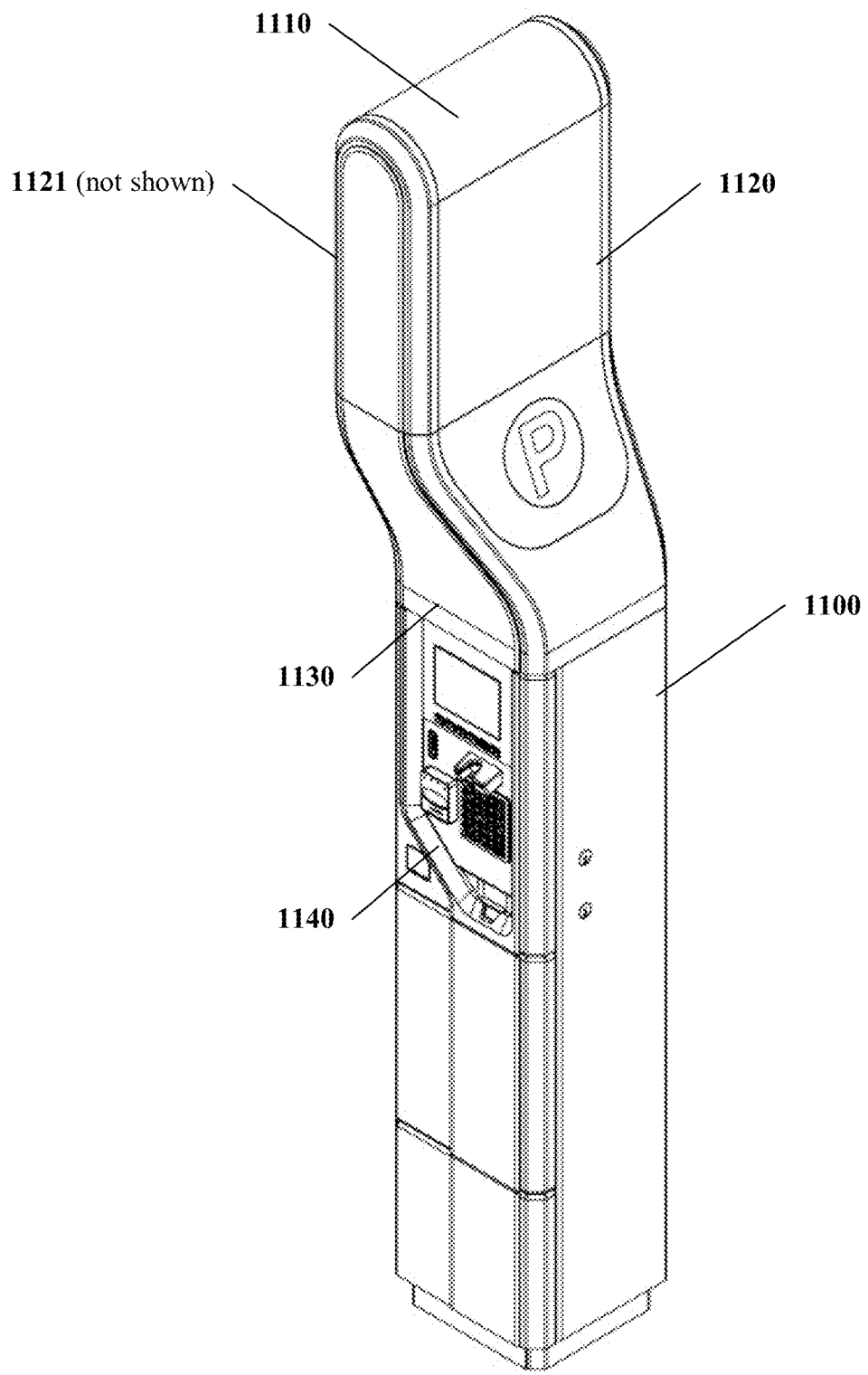
FIG. 11 shows a non-limiting example of parking pay station 1100; in this case, a parking pay station including a video display cap with two media display screens in a vertical (portrait) orientation, one display screen on each of the left and right sides of the pay station.
Figure 12:
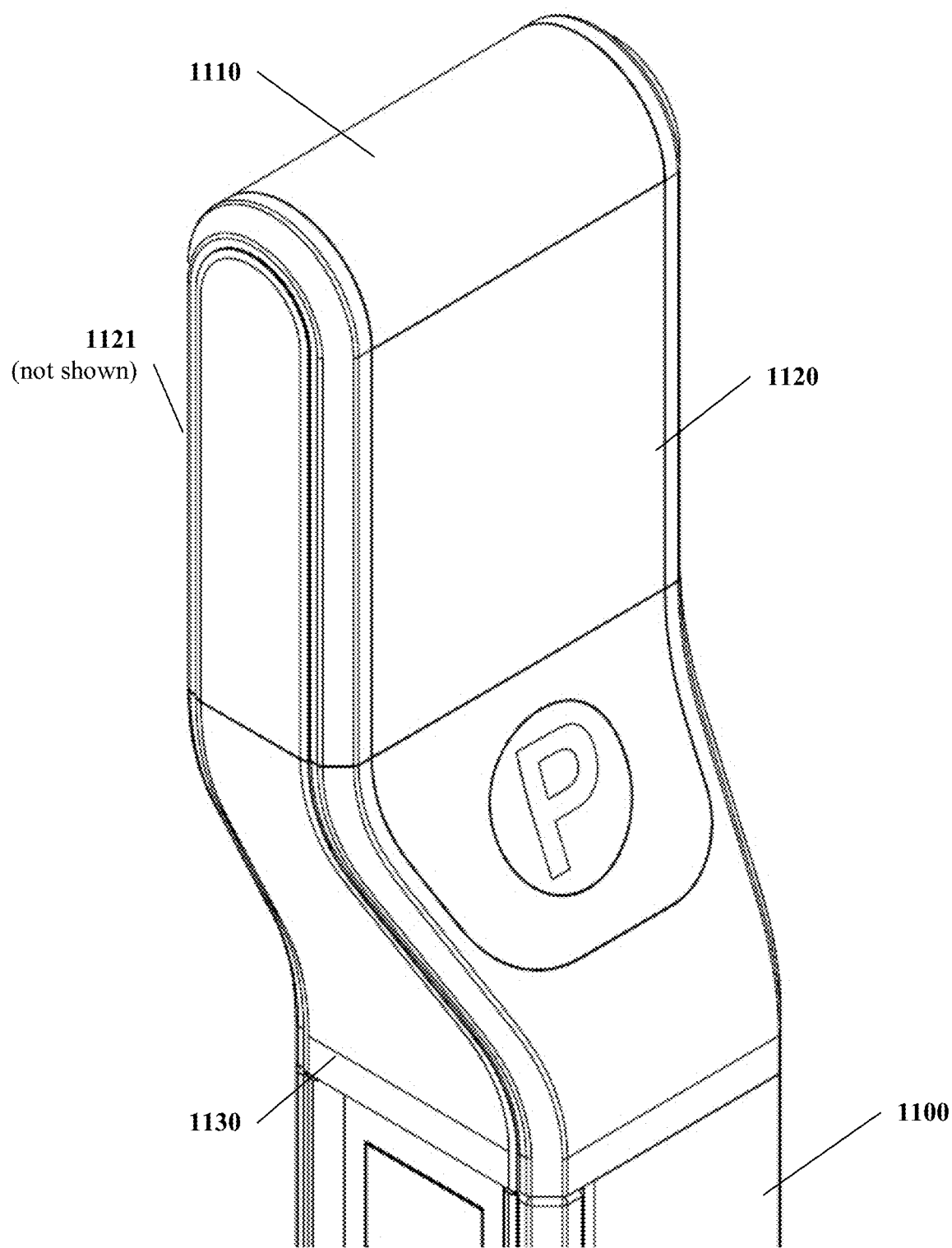
FIG. 12 shows an expanded view of the upper portion of the non-limiting example of parking pay station 1100 in FIG. 11.

Referring to FIGS. 11 and 12, in a particular embodiment, a parking pay station 1100 comprises a media display cap 1110 comprising a media display screen 1120 on the right side panel of the media display cap 1110, and a media display screen 1121 (not shown) on the left side panel of the media display cap 1110 when the parking user is facing the front panel of the parking pay station 1100 to pay parking fees. The media display cap 1110 optionally comprises solar panel, e.g., on the top surface or any of the side panels of media display cap 1110. The media display cap 1110 optionally comprises an adapter 1130 on a bottom surface of media display cap 1110. The adapter 1130 is configured to interface between the media display cap 1110 and a parking meter 1140 such that the media display cap 1110 can retrofit the parking meter 1140 and add video displaying capacity to the parking meter 1140. The media display cap 1110 optionally comprises one or more sensors comprising a camera, a vehicle sensor, a pedestrian sensor, or a combination thereof. The one or more sensors are described below in more details. The media display cap 1110 adopts an irregular shape in such a way that width of the media display cap 1110, at least in certain part, is narrower than the width of the parking meter 1140 on one dimension. In other embodiments, width of the media display cap 1110, at least in certain part, is wider than the width of the parking meter 1140 on one dimension. For example, when the screen size of the media display screen 1120 is larger such that the total width of the media display cap 1110 is larger than the width of the parking meter 1140 on the side panel. The media display cap 1110 or the parking pay station optionally comprise a sign of "P" on at least one of the side panels. The right side panel of media display cap 1110 is curved on the bottom part to match the narrower width of the parking meter.

Figure 13:
FIG. 13 shows the front view and rear view of another non-limiting example of a parking pay station.

FIG. 13 shows perspective views of the front view (panel A) and rear view (panel B) of a parking pay station having two media display screen on side panels. As shown in panel A, the media display cap comprises a curved top surface, and one media display screen on the right side panel of the media display cap such that when a parking user is paying parking fees, a passer-by can view the contents from the media display screen on the right side panel without being blocked by the parking user. Both media display screens are in portrait orientation as shown. The parking pay station also comprises a parking meter underneath and interfaced with the media display cap. The media display cap is in an irregular shape in that for the front panel the width of the top portion of the media display cap is narrower than the width of the bottom portion of the media display cap as shown in panel A. As shown in panel B, the media display cap comprises a curved top surface, and one media display screen on the left side panel of the media display cap such that when a parking user is paying parking fees, a passer-by can view the contents from the media display screen on the left side panel without being blocked by the parking user. The parking pay station also comprises a parking meter underneath and interfaced with the media display cap. The media display cap is in an irregular shape in that for the back panel the width of the top portion of the media display cap is narrower than the width of the bottom portion of the media display cap as shown in panel B. Both the left and right side panels display the symbol "P" to indicating parking.

Figure 14:
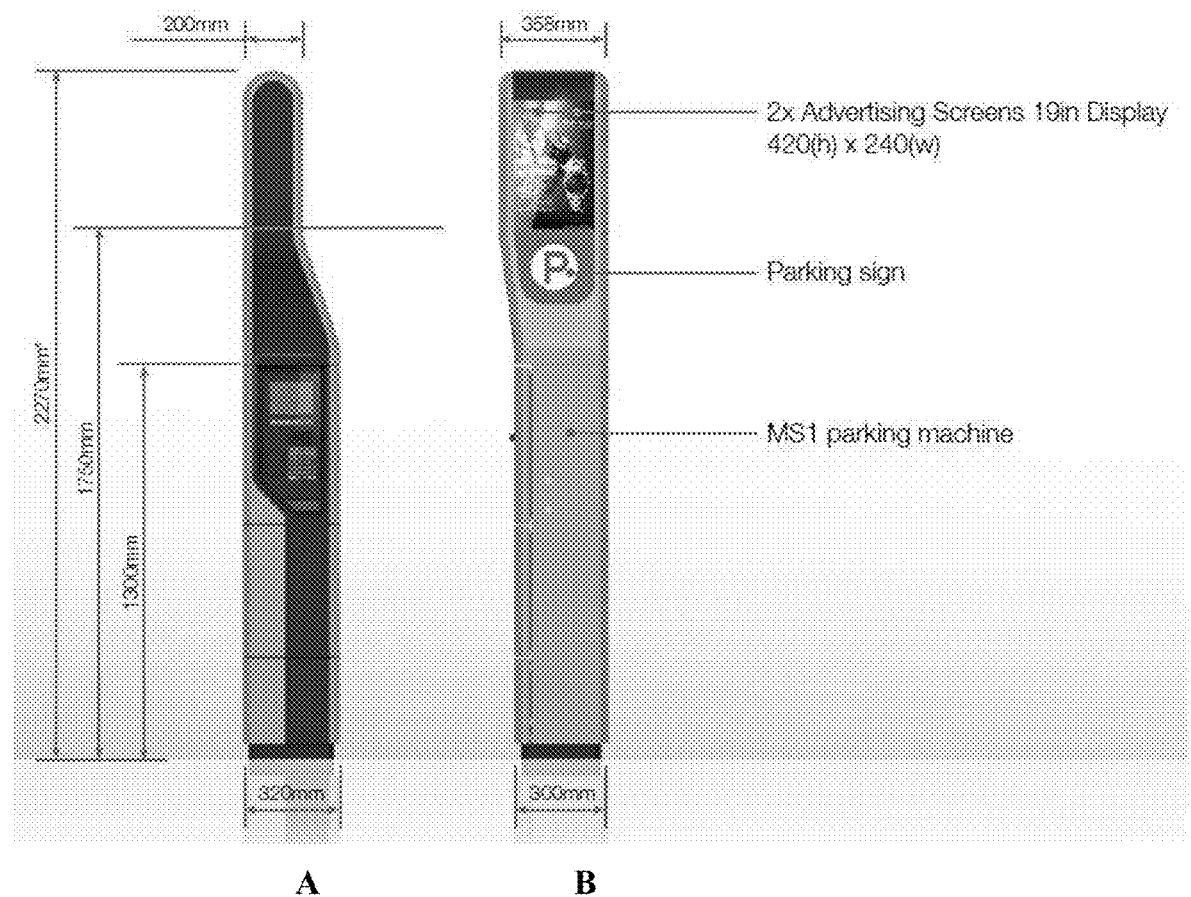
FIG. 14 shows still another non-limiting example of a parking pay station.

Referring to FIG. 14, in a particular embodiment, a front view (panel A) and a side view (panel B) of a parking pay station are shown. As shown in panel A, the parking pay station is about 2,270 mm in height with the parking meter having a height of about 1300 mm in the lower portion of the parking pay station. The width of the parking meter is about 320 mm in width when viewing from the front face of the parking pay station. The bottom face of the media display cap has a width of about 320 mm on the front panel. In addition, the media display cap is about 970 mm in height with an irregular shape for the front panel. Specifically, for the front panel the top portion is about 520 mm in height and substantially rectangular with a curved top, while the bottom portion is about 450 mm in height and substantially a right trapezoid. There is no media display screen on the front panel of the media display cap. As show in panel B, the width of the side panel for the top portion of the media display cap is about 358 mm and substantially rectangular, with a 19 inch video display screen (about 420 mm (h)×240 mm (w) in dimensions). As shown the video display screen is in the portrait orientation with its bottom edge about 1750 mm above the bottom edge of the parking pay station. The width of side panel for the parking meter on the lower part of the parking pay station is about 300 mm. The parking pay station optionally comprises a solar panel, e.g., on the curved top or any of the side panels. The parking pay station optionally comprises a parking sign of "P" on at least one side panel. One of the media display screens is on the right side panel of the media display cap while the other is on the left side panel of the media display cap. Both media display screens are 19 inch video display screens. In addition, the media display cap optionally comprises an integrated rain gutter design (not shown) at or near the bottom face of the media display cap such that collected precipitation (rain or snow) can be drained. In some embodiments, the integrated rain gutter design is part of the adapter that is configured to interface between the media display cap and a parking meter so that the parking meter can be retro fit with the media display cap. In this particular embodiment, the parking pay station is an MS1 parking machine and the media display screen is not facing a parking user when the parking user is using the parking pay station to pay parking fees. Rather, the media display screens on the side panels can be viewed by passers-by when a parking user is using the parking pay station to pay parking fees.

Figure 15:
FIG. 15 shows a non-limiting examples of a parking pay station; in this case, a parking pay station including a video display cap with two media display screens in a horizontal (landscape) orientation, one display screen on each of the left and right sides of the pay station.

FIG. 15 shows perspective views of the front view (panel A) and rear view (panel B) of a parking pay station having two media display screen on side panels. As shown in panel A, the media display cap comprises a curved top surface, and one media display screen on the right side panel of the media display cap such that when a parking user is paying parking fees, a passer-by can view the contents from the media display screen on the right side panel without being blocked by the parking user. Both media display screens are in landscape orientation as shown. The parking pay station also comprises a parking meter underneath and interfaced with the media display cap. The media display cap is in an irregular shape in that for the front panel the width of the top portion of the media display cap is narrower than the width of the bottom portion of the media display cap, while for the side panels the width of the top portion of the media display cap is wider than the width of the bottom portion of the media display cap to accommodate the size of the media display screen, as shown in panel A. As shown in panel B, the media display cap comprises a curved top surface, and one media display screen on the left side panel of the media display cap such that when a parking user is paying parking fees, a passer-by can view the contents from the media display screen on the left side panel without being blocked by the parking user. The parking pay station also comprises a parking meter underneath and interfaced with the media display cap. The media display cap is in an irregular shape in that for the back panel the width of the top portion of the media display cap is narrower than the width of the bottom portion of the media display cap, while for the side panels the width of the top portion of the media display cap is wider than the width of the bottom portion of the media display cap to accommodate the size of the media display screen, as shown in panel B. Both the left and right side panels display the symbol "P" to indicating parking.

Figure 16:
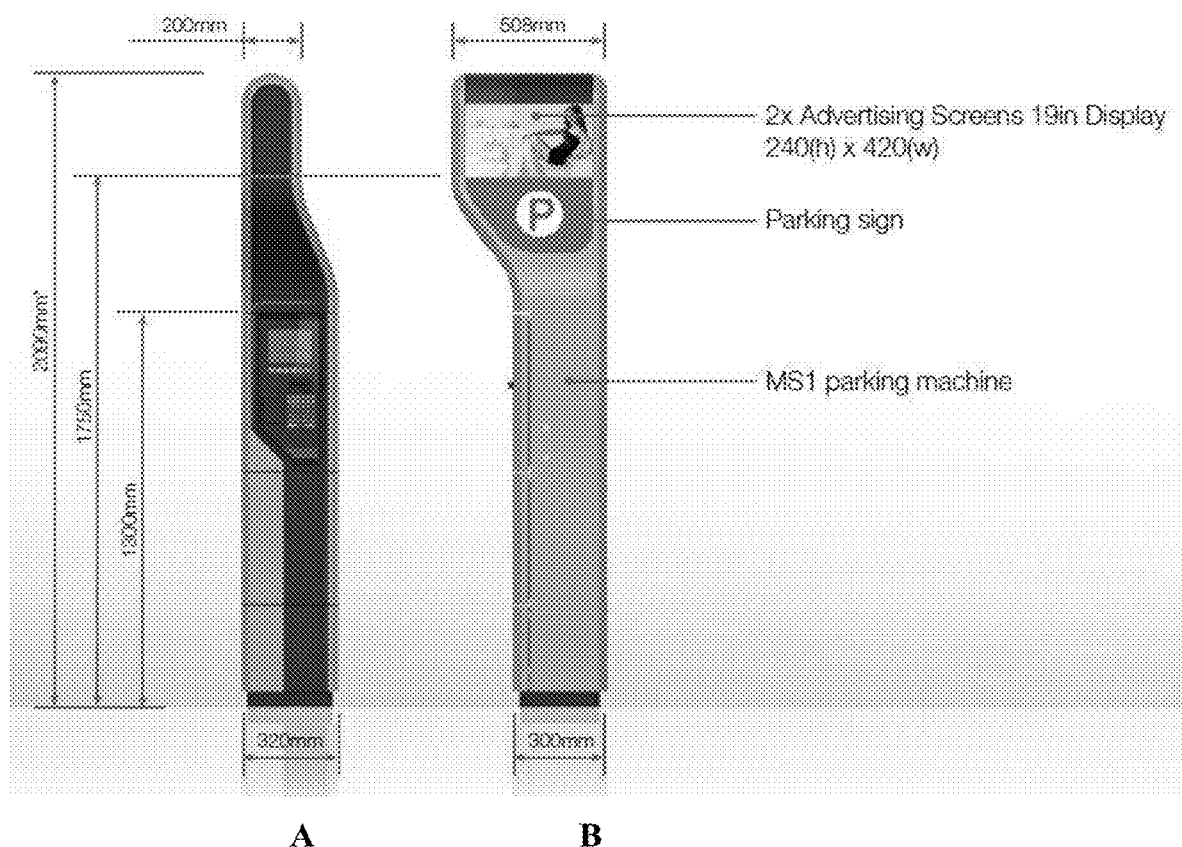
FIG. 16 shows another non-limiting example of a parking pay station.

Referring to FIG. 16, in a particular embodiment, a front view (panel A) and a side view (panel B) of a parking pay station are shown. As shown in panel A, the parking pay station is about 2,090 mm in height with the parking meter having a height of about 1300 mm in the lower portion of the parking pay station. The width of the parking meter is about 320 mm in width when viewing from the front face of the parking pay station. The bottom face of the media display cap has a width of about 320 mm on the front panel. In addition, the media display cap is about 790 mm in height with an irregular shape for the front panel. Specifically, for the front panel the top portion is about 340 mm in height and 200 mm in width, and substantially rectangular with a curved top, while the bottom portion is about 450 mm in height and substantially a right trapezoid with a top width of about 200 mm and bottom width of about 320 mm. There is no media display screen on the front panel of the media display cap. As show in panel B, the width of the side panel for the top portion of the media display cap is about 508 mm and substantially rectangular to accommodate a 19 inch video display screen (about 240 mm (h)×420 mm (w) in dimensions). As shown the video display screen is in the landscape orientation. The width of the side panel for the parking meter on the lower part of the parking pay station is substantially a right trapezoid with a top width of about 508 mm and bottom width of about 300 mm. The parking pay station optionally comprises a solar panel, e.g., on the curved top or any of the side panels. The parking pay station optionally comprises a parking sign of "P" on at least one side panel. One of the media display screens is on the right side panel of the media display cap while the other is on the left side panel of the media display cap. Both media display screens are 19 inch video display screens. In addition, the media display cap optionally comprises an integrated rain gutter design (not shown) at or near the bottom face of the media display cap such that collected precipitation (rain or snow) can be drained. In some embodiments, the integrated rain gutter design is part of the adapter that is configured to interface between the media display cap and a parking meter so that the parking meter can be retro fit with the media display cap. In this particular embodiment, the parking pay station is an MS1 parking machine and the media display screen is not facing a parking user when the parking user is using the parking pay station to pay parking fees. Rather, the media display screens on the side panels can be viewed by passers-by when a parking user is using the parking pay station to pay parking fees.

Figure 17:
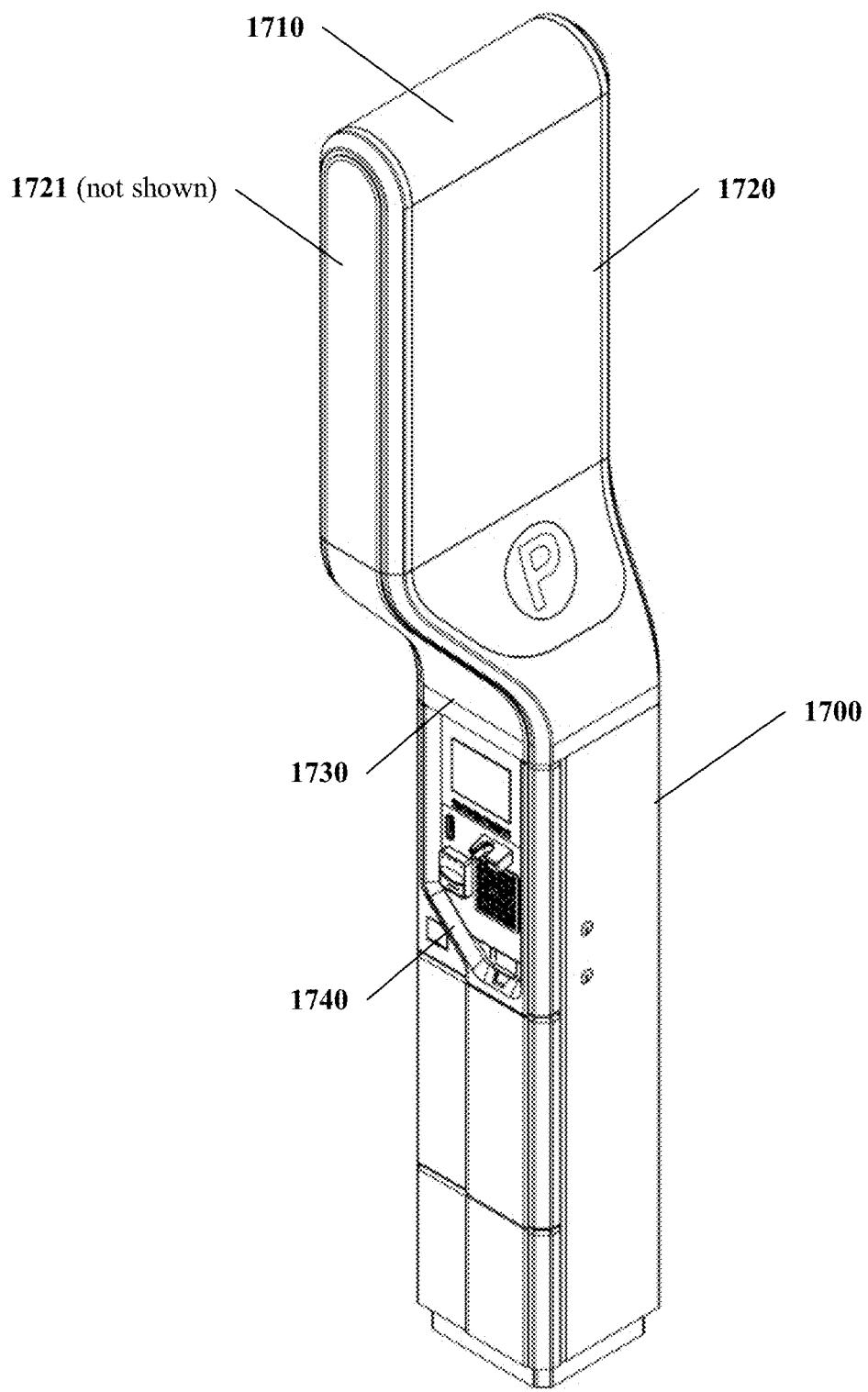
FIG. 17 shows a non-limiting examples of parking pay station 1700; in this case, a parking pay station including a video display cap with two media display screens in a vertical (portrait) orientation, one display screen on each of the left and right sides of the pay station.
Figure 18:
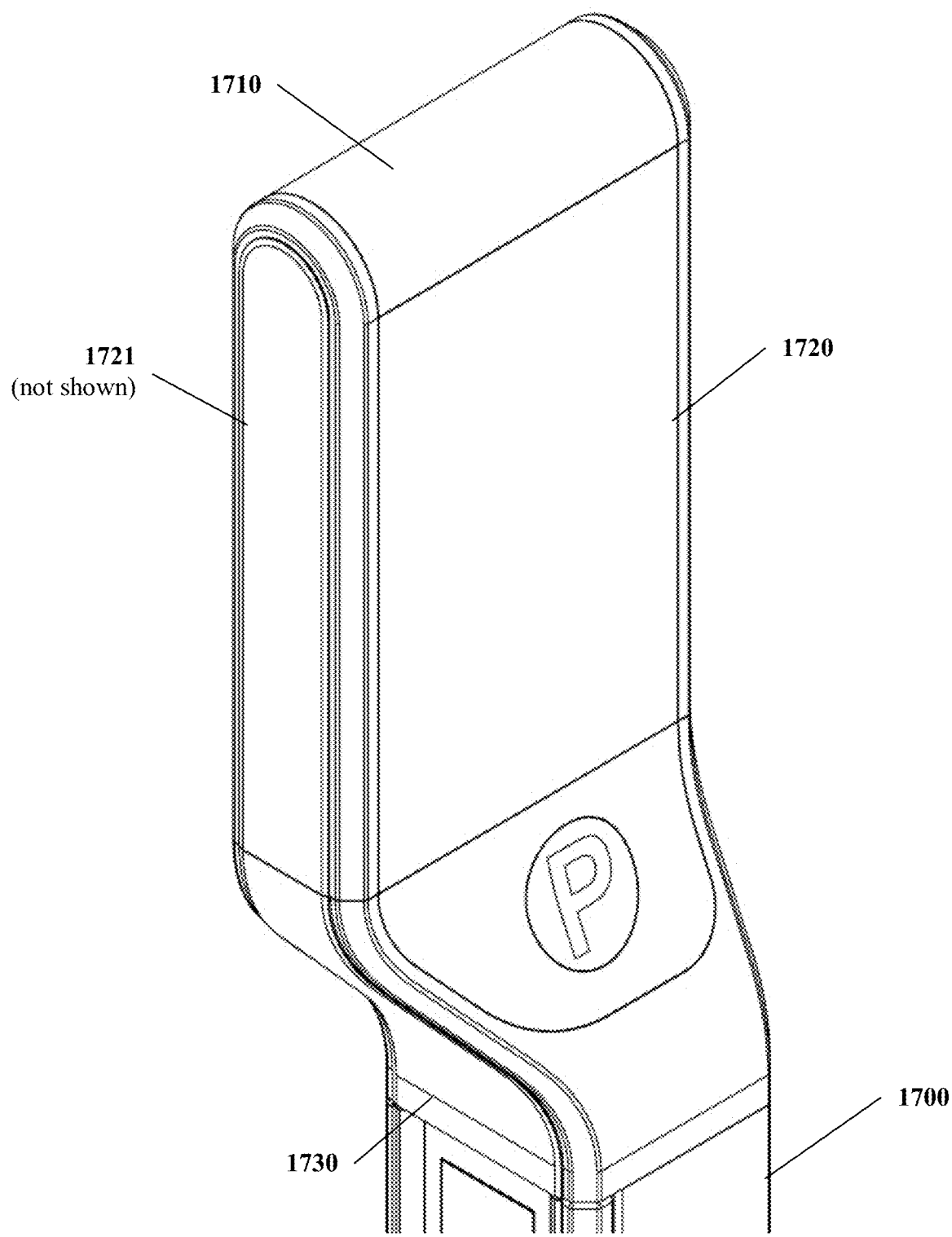
FIG. 18 shows an expanded view of the upper portion of the non-limiting example of parking pay station 1700 in FIG. 17.

Referring to FIGS. 17 and 18, in a particular embodiment, a parking pay station 1700 comprises a media display cap 1710 comprising a media display screen 1720 on the right side panel of the media display cap 1710, and a media display screen 1721 (not shown) on the left side panel of the media display cap 1710 when the parking user is facing the front panel of the parking pay station 1700 to pay parking fees. The media display cap 1710 optionally comprises solar panel, e.g., on the top surface or any of the side panels of media display cap 1710. The media display cap 1710 optionally comprises an adapter 1730 on a bottom surface of media display cap 1710. The adapter 1730 is configured to interface between the media display cap 1710 and a parking meter 1740 such that the media display cap 1710 can retrofit the parking meter 1740 and add video displaying capacity to the parking meter 1740. The media display cap 1710 optionally comprises one or more sensors comprising a camera, a vehicle sensor, a pedestrian sensor, or a combination thereof. The one or more sensors are described below in more details. The media display cap 1710 adopts an irregular shape in such a way that width of the media display cap 1710, at least in certain part, is narrower than the width of the parking meter 1740 on one dimension. In other embodiments, width of the media display cap 1710, at least in certain part, is wider than the width of the parking meter 1740 on one dimension. For example, when the screen size of the media display screen 1720 is larger such that the total width of the media display cap 1710 is larger than the width of the parking meter 1740 on the side panel. The media display cap 1710 or the parking pay station optionally comprise a sign of "P" on at least one of the side panels. The right side panel of media display cap 1710 is curved on the bottom part to match the narrower width of the parking meter.

Figure 19:
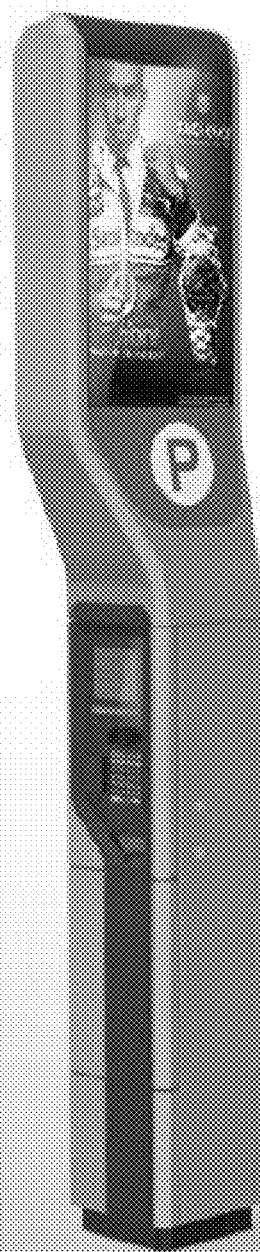
FIG. 19 shows the front view and rear view of another non-limiting example of a parking pay station.
Figure 19:
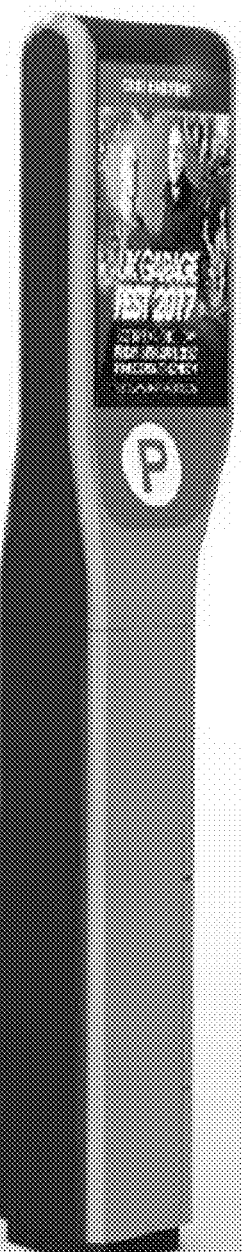

FIG. 19 shows perspective views of the front view (panel A) and rear view (panel B) of a parking pay station having two media display screen on side panels. As shown in panel A, the media display cap comprises a curved top surface, and one media display screen on the right side panel of the media display cap such that when a parking user is paying parking fees, a passer-by can view the contents from the media display screen on the right side panel without being blocked by the parking user. Both media display screens are in portrait orientation as shown. The parking pay station also comprises a parking meter underneath and interfaced with the media display cap. The media display cap is in an irregular shape in that for the front panel the width of the top portion of the media display cap is narrower than the width of the bottom portion of the media display cap, while for the side panels the width of the top portion of the media display cap is wider than the width of the bottom portion of the media display cap to accommodate the size of the media display screen, as shown in panel A. As shown in panel B, the media display cap comprises a curved top surface, and one media display screen on the left side panel of the media display cap such that when a parking user is paying parking fees, a passer-by can view the contents from the media display screen on the left side panel without being blocked by the parking user. The parking pay station also comprises a parking meter underneath and interfaced with the media display cap. The media display cap is in an irregular shape in that for the back panel the width of the top portion of the media display cap is narrower than the width of the bottom portion of the media display cap, while for the side panels the width of the top portion of the media display cap is wider than the width of the bottom portion of the media display cap to accommodate the size of the media display screen, as shown in panel B. Both the left and right side panels display the parking sign "P" to indicating parking.

Figure 20:
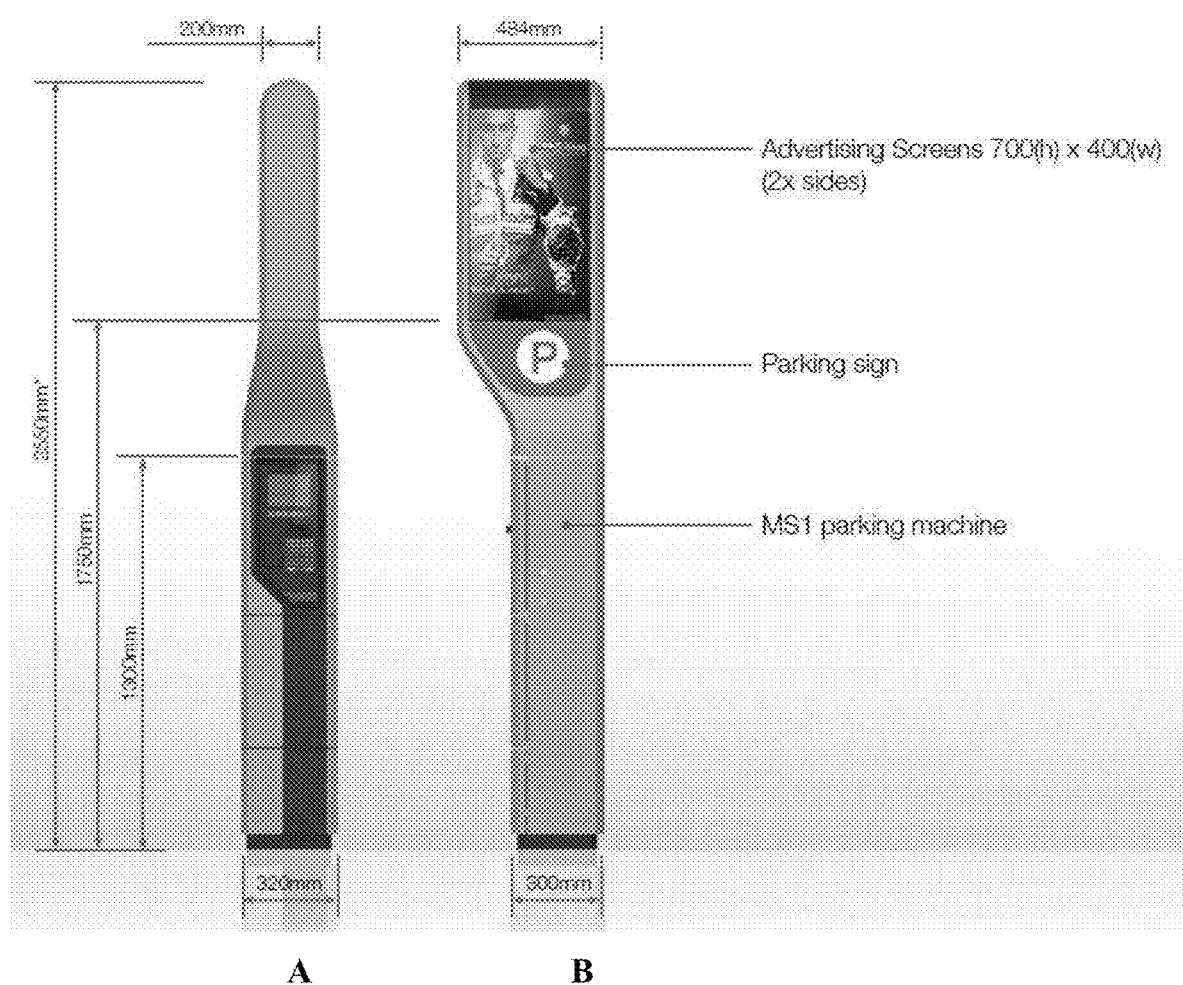
FIG. 20 shows still another non-limiting example of a parking pay station.

Referring to FIG. 20, in a particular embodiment, a front view (panel A) and a side view (panel B) of a parking pay station are shown. As shown in panel A, the parking pay station is about 2,550 mm in height with the parking meter having a height of about 1300 mm in the lower portion of the parking pay station. The width of the parking meter is about 320 mm in width when viewing from the front face of the parking pay station. The bottom face of the media display cap has a width of about 320 mm on the front panel. In addition, the media display cap is about 1250 mm in height with an irregular shape for the front panel. Specifically, for the front panel the top portion is about 800 mm in height and about 200 mm in width, and substantially rectangular with a curved top, while the bottom portion is about 450 mm in height and substantially an isosceles trapezoid with a top width of about 200 mm and a bottom width of about 320 mm. There is no media display screen on the front panel of the media display cap. As show in panel B, the side panel for the top portion of the media display cap is substantially rectangular with 800 mm (h)×484 mm (w) in dimensions to accommodate a video display screen (about 700 mm (h)× 400 mm (w) in dimensions). As shown the video display screen is in the portrait orientation. The width of side panel for the parking meter on the lower part of the parking pay station is substantially a right trapezoid with a top width of 484 mm and bottom width of 300 mm. The parking pay station optionally comprises a solar panel, e.g., on the curved top or any of the side panels. The parking pay station optionally comprises a parking sign of "P" on at least one side panel. One of the media display screens is on the right side panel of the media display cap while the other is on the left side panel of the media display cap. In addition, the media display cap optionally comprises an integrated rain gutter design (not shown) at or near the bottom face of the media display cap such that collected precipitation (rain or snow) can be drained. In some embodiments, the integrated rain gutter design is part of the adapter that is configured to interface between the media display cap and a parking meter so that the parking meter can be retro fit with the media display cap. In this particular embodiment, the parking pay station is an MS1 parking machine and the media display screen is not facing a parking user when the parking user is using the parking pay station to pay parking fees. Rather, the media display screens on the side panels can be viewed by passers-by when a parking user is using the parking pay station to pay parking fees.

Figure 21:
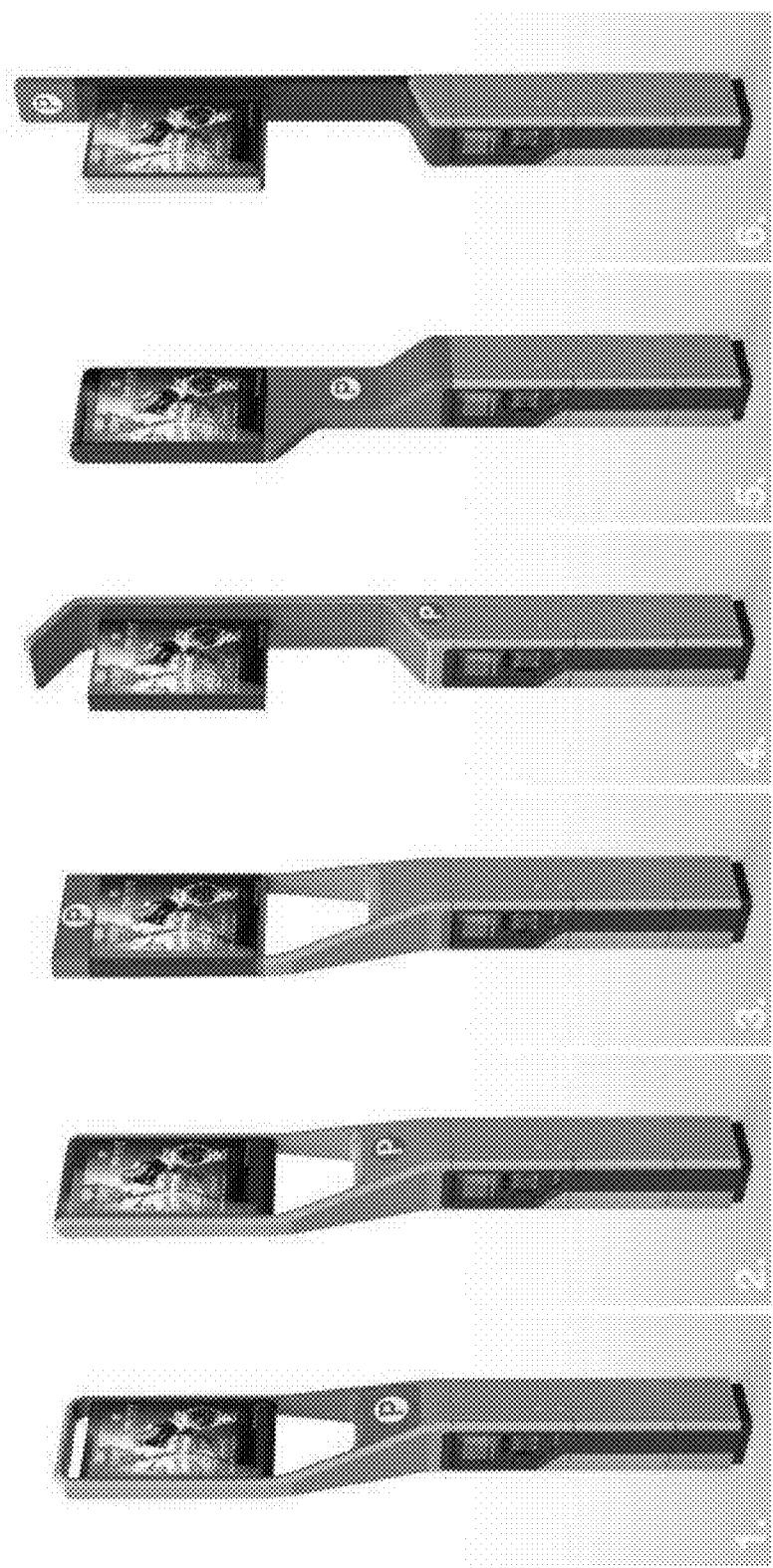
FIG. 21 shows six non-limiting examples of parking pay stations; in these cases, parking pay stations with two media display screens and showing alternative configurations.

Referring to FIG. 21, in a particular embodiment, six different parking pay stations are shown in panels A-F, all of which have two media display screens on the side panels of the media display cap and the media display screen are in portrait orientations. Specifically, panels A-C show media display caps that have openings above and/or below the media display screens to allow free flow of air. Such designs have advantages, such as, for example, providing better ventilation for and cooling of the media display screens, or providing a space to place advertising materials. In addition, panels D and F show media display caps that use a vertical side bar to secure the media display screens by one side. The vertical side bar has a bent top portion in panel D while the vertical side bar is straight in panel F. A solar panel can optionally be placed on the side bars, for example, on the bent part of the side bar in panel D. Again such designs provide better ventilation for and cooling of the media display screens. Panel E shows a media display cap that has an irregular bottom portion to connect the top portion of the media display cap with the parking meter underneath the media display cap. Such a design accommodates any geometric limitations of the location where the parking meter is located, such as, for example, the space above the parking meter is blocked in any way by other structures. In all cases, the media display caps optionally display a parking sign of "P" on at least one side panel or on the side bars as shown.

Figure 22:
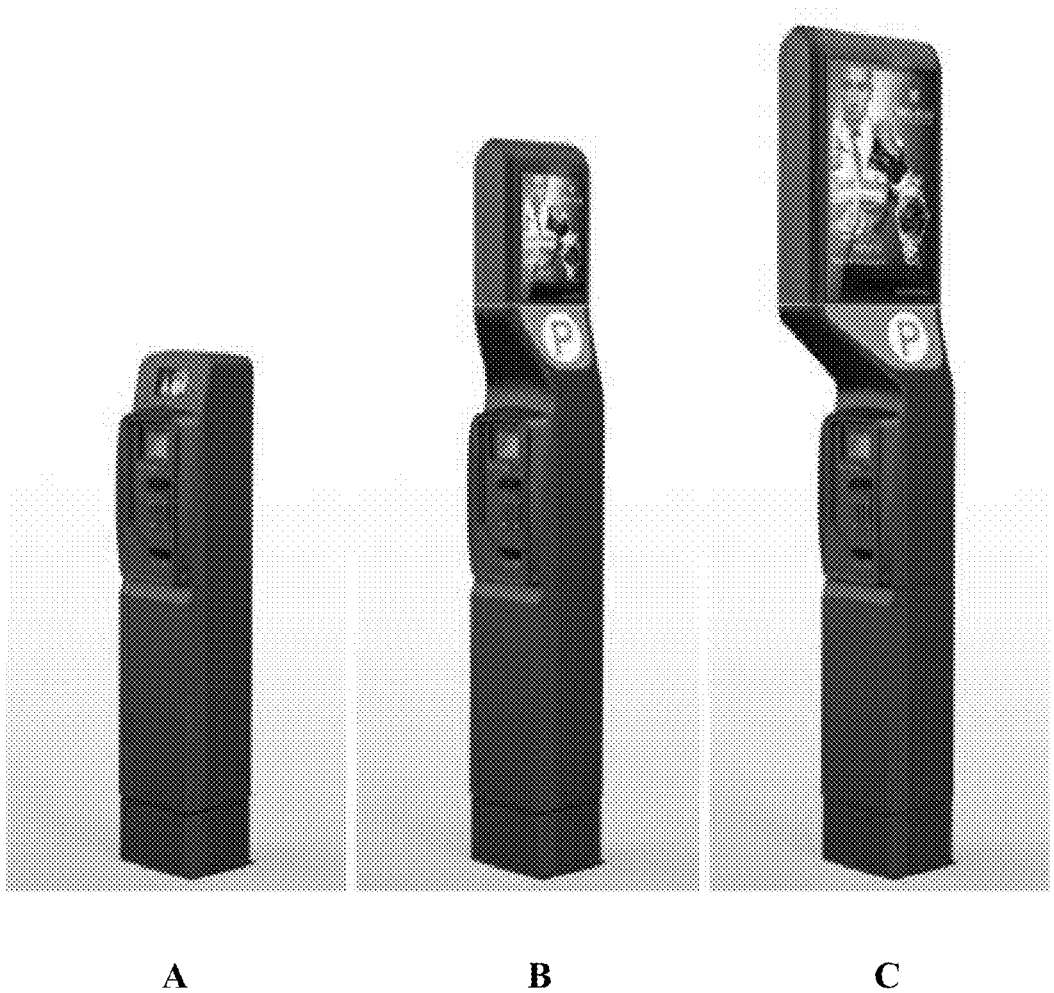
FIG. 22 shows three non-limiting examples of parking pay stations showing alternative configurations; in these cases, parking pay stations upgraded to have improved media display capability by retrofit with a video display cap described herein, wherein the video display cap includes one or two media display screens.

Referring to FIG. 22, different configurations of parking pay stations comprising an existing parking meter and a media display cap are shown in panels A-C. Panel A shows an existing parking meter is refitted with a media display cap having one media display screen facing a parking user when the parking user is using the parking meter. In addition, Panel B shows an existing parking meter is refitted with a media display cap having two media display screens on side panels such that when a parking user is using the parking meter, the parking user is not blocking the two media display screens on side panels. Furthermore, Panel B shows another upgraded parking pay station. In this example the existing parking meter is refitted with a media display cap having two media display screens on side panels such that when a parking user is using the parking meter, the parking user is not blocking the two media display screens on side panels. As shown in panel A-C, the sizes of the media display screens are different, the size of the media display cap are different, and the places to put the media display screens on the media display cap are different. The choice of different configurations of the media display cap to refit existing parking meters is based on various factors, including but not limited to, the availability of power for the added media display caps, the physical constrains placed on the immediate surrounding of the existing parking meter, especially the space above the existing parking meter, the expected viewing angles for or numbers of passers-by near the existing parking meter, and the consideration for the optionally added sensors in the media display cap to acquire signals. As shown in FIG. 22, existing parking meters can be refitted and upgraded such that their functions are improved to provide media displaying capabilities, and optionally environmental sensing capabilities when sensors are installed inside the added media display caps.

Media Display Screen

In some embodiments, the parking pay station media display caps, parking pay stations, parking pay station advertising platforms, and methods described herein include one or more media display screens, or use of the same. In some embodiments, a parking pay station media display cap or a parking pay station includes one or more media display screens configured for viewing by a parking user, e.g., on the front of the parking pay station. In further embodiments, a parking pay station media display cap or a parking pay station includes 1, 2, 3, or more media display screens configured for viewing by a parking user. In some embodiments, a parking pay station media display cap or a parking pay station includes one or more media display screens configured for viewing by pedestrians, e.g., on one or more sides and/or the back of the parking pay station. In further embodiments, a parking pay station media display cap or a parking pay station includes 1, 2, 3, or more media display screens on each of the sides and/or the back of the parking pay station configured for viewing by pedestrians.

Many sizes of media display screens are suitable. In some embodiments, a media display screen has a size of about 3, 4, 5, 6, 7, 8, 9, 10, 11, 12, 13 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more inches in the diagonal direction. In a particular embodiment, a suitable media display screen is a 7 inch diagonal screen with a 16:9 aspect ratio. In another particular embodiment, a suitable media display screen is a 19 inch diagonal screen with a 16:9 aspect ratio. In another particular embodiment, a suitable media display screen is a 32 inch diagonal screen with a 16:9 aspect ratio.

Multiple orientations of media display screens are suitable. In some embodiments, a media display screen is implemented in a vertical (e.g., portrait) orientation. In other embodiments, a media display screen is implemented in a horizontal (e.g., landscape) orientation.

Media

In some embodiments, the parking pay station media display caps, parking pay stations, parking pay station advertising platforms, and methods described herein include media, or use of the same. In some embodiments, media is pre-loaded into a parking pay station or a media display cap when it is installed. In other embodiments, media is loaded into a parking pay station or a media display cap for display by transfer from a physical memory device. In yet other embodiments, media is transmitted to a parking pay station or a media display cap for display via a network communications device. In some embodiments, a parking pay station and/or a media display cap comprise a memory to store media for display.

In some embodiments, the media comprises audio such as voice over, sound effects, music, sound tracks, and the like. Many audio formats are suitable including, by way of non-limiting examples, MP3, WAV, AIFF, AU, Apple® Lossless, MPEG-4, Windows Media®, Vorbis, AAC, and Real Audio®.

In some embodiments, the media comprises video such as web videos (from YouTube, Hulu, Vimeo, etc.), movies, television shows, music videos, and the like. Many video formats are suitable including, by way of non-limiting examples, Windows® Media Video (WMV), Windows® Media®, Motion Picture Experts Group (MPEG), Audio Video Interleave (AVI), Apple® QuickTime®, RealMedia®, Flash Video, Motion JPEG (M-JPEG), WebM, and Advanced Video Coding High Definition (AVCHD). In other embodiments, video is compressed. Both lossy and lossless video CODECs are suitable including, by way of non-limiting examples, DivX™, Cineform, Cinepak, Dirac, DV, FFV1, H.263, H.264, H.264 lossless, JPEG 2000, MPEG-1, MPEG-2, MPEG-4, On2 Technologies (VPS, VP6, VP7, and VP8), RealVideo, Snow lossless, Sorenson Video, Theora, and Windows Media Video (WMV). In some embodiments, video content is standard-definition. In other embodiments, video content is high-definition. In further embodiments, a high-definition image or video frame includes at least about 1280×about 720 pixels or at least about 1920×about 1080 pixels.

Sensors

In some embodiments, the parking pay station media display caps, parking pay stations, parking pay station advertising platforms, and methods described herein include one or more sensors, or use of the same. In various embodiments, the parking pay station or the media display cap comprises about 1, 2, 3, 4, 5, 6, 7, 8, 9, 10 or more sensors.

An example of a suitable sensor is a camera. In some embodiments, a camera images persons and objects within the vicinity of a parking pay station. In further embodiments, a camera images a parking user interacting with a pay station. In further embodiments, a camera images pedestrians (e.g., people other than the parking user) within the vicinity of a parking pay station. In some embodiments, a camera images objects such as one or more vehicles (e.g., bicycles, scooters, skateboards, etc.) near a parking pay station. In some embodiments, a camera images areas such as one or more sidewalks, roads, parks, stores, and/or parking spaces near a parking pay station. Further examples of suitable sensors include, by way of non-limiting examples, those that detect or measure sound. In some embodiments, a sound sensor detects or measures sounds from persons such as parking users and pedestrians, vehicles such as cars, motorcycles, and bicycles, and the like. Further examples of suitable sensors include, by way of non-limiting examples, those that detect or measure the presence of a Bluetooth device, including a cell phone or smart phone.

In some embodiments, a sensor is wirelessly connected to a network in order to communicate sensor data to one or more remote servers or to a cloud computing system or service, to receive instructions or commands, and to send out sensor data. In other embodiments, a sensor is self-powered by a battery. In some embodiments, a sensor is wirelessly charged. In other embodiments, a sensor is wired to and powered by a power source. In some embodiments, a sensor has a wired connection to an external power source, such as a powered DC or a powered parking pay station. In some embodiments, a sensor reads an RFID tag. In further embodiments, where a sensor reads an RFID tag, the sensor determines configuration information associated with the sensor and recalibrates itself accordingly. In still further embodiments, the configuration information associated with the sensor includes operation parameters affecting the operation of the sensor, maintenance record of the sensor, and record of data reporting, etc.

In some embodiments, the sensor is a vehicle sensor. In some embodiments, a suitable environmental sensor is any sensor that is capable of emitting a signal and detecting the signal when it is reflected back from the surface of a vehicle that moves into a single parking space or multiple parking spaces associated with a parking pay station. Examples of suitable vehicle sensors include, by way of non-limiting examples, radar, low power/broad spectrum radar, time of flight sensors, ranging sensors, magnetic sensors, magnetic-flux sensors, non-intrusive sensors, capacitance sensors, proximity sensors, ultrasonic sensors, infrared sensors, microwave sensors, and the like. In other embodiments, a vehicle sensor is a mass sensor, e.g., a magnetometer.

In some embodiments, the sensor is an environmental sensor. In some embodiments, a suitable environmental sensor is any sensor that is capable of making a qualitative assessment or a quantitative measurement of a physical or chemical aspect of the area immediately surrounding the meter. Examples of suitable environmental sensors include, by way of non-limiting examples, those that detect or measure atmospheric pressure, humidity, wind speed, wind direction, precipitation, flooding, seismic activity, light, UV index, and/or temperature. In other embodiments, the environmental sensor detects sound, chemicals, including gaseous chemicals or liquid chemicals or solid chemicals, or images. In some embodiments, the environmental sensor transmits information, such as detected chemicals, via a communications element of the parking pay station or the media display cap.

Further examples of suitable environmental sensors include, by way of non-limiting examples, those that detect or measure air particulates, air pollution, and/or water pollution. In various embodiments, suitable air pollution sensors include those that detect or measure pathogens, sulfur oxides ($SO_x$), nitrogen oxides ($NO_x$), greenhouse gases, carbon monoxide (CO), carbon dioxide ($CO_2$), methane, volatile organic compounds (VOCs), toxic metals (such as lead and mercury), chlorofluorocarbons (CFCs), ammonia ($NH_3$), ground level ozone ($O_3$), and/or peroxyacetyl nitrate (PAN). In various embodiments, suitable water pollution sensors include those that detect or measure detergents, insecticides, pathogens, hydrocarbons, VOCs, chlorinated solvents, perchlorate, fertilizers, and heavy metals.

Further examples of suitable environmental sensors include, by way of non-limiting examples, those that detect or measure chemical agents, biological agents, natural gas, radiation, and/or electromagnetic energy.

In some embodiments, sensors are installed on a plurality of parking pay stations throughout a municipality. In further embodiments, the sensor-enabled parking pay stations have communication capability and form a sensor network by transmitting information from a range of territory within the municipality to a central management server. By forming a sensor network, upgraded parking pay stations allow officials of the municipality to monitor the environment on an ongoing basis or in an emergency. By way of example, a sensor network is optionally used to monitor point sources of air pollution within the municipality on a continual basis. By way of further example, a sensor network is optionally used to monitor spread of radiation within the municipality during an act of war or terrorism. By way of further example, a sensor network is optionally used to determine the location of gunshots fired within a municipality. By way of further example, a sensor network is optionally used to monitor flooding within the municipality in an extreme weather event.

In some embodiments, the sensor-enabled parking pay stations collect occupancy data from selected parking lots within the detection range of each individual sensor. In some embodiments, the occupancy data comprise the number of parking spaces occupied, the number of parking spaces still vacant, and/or the parking time expected or paid for each occupied parking space. In some embodiments, the collection of the occupancy data can be periodical, e.g., every ten minutes or hourly, during the peak time, e.g., during special events or rush hours, in real-time, upon a command by a manager, e.g., in an emergency. In some embodiments, the collected occupancy data are communicated to one or more remote servers or to a cloud computing system or service. In some embodiments, the sensor that collects the occupancy data is a vehicle sensor.

In some embodiments, the sensor-enabled parking pay stations collect traffic data from selected streets within the detection range of each individual sensor. In some embodiments, the sensor detects the number of vehicles passing a specific position on the street within a previously determined time window. In some embodiments, the sensor detects the number of vehicles passing an intersection between changes of the traffic light signals. In some cases, the sensor detects the length of time of a vehicle remaining on or near the same position on the street, e.g., the length of time for a vehicle to move about 5 meters on the street. In some embodiments, the collection of the traffic data can be periodical, e.g., every ten minutes or hourly, during the peak time, e.g., during special events or rush hours, in real-time, upon a command by a manager, e.g., in an emergency. In some embodiments, the collected traffic data are communicated to one or more remote servers or to a cloud computing system or service. In some embodiments, the sensor that collects the traffic data is a vehicle sensor. In some embodiments, the sensor that collects the traffic data is a camera.

In some embodiments, the sensor-enabled parking pay stations collect pedestrian data from selected streets or parking lots within the detection range of each individual sensor. In some embodiments, the pedestrian is a viewer of the advertising displayed by the parking pay station. In some embodiments, the sensor detects the number of pedestrians passing a specific position on the street within a previously determined time window. In some embodiments, the sensor detects the number of pedestrians walking over a crossing on the street between changes of the traffic light signals. In some cases, the sensor detects the length of time of a pedestrian remaining on or near the same position on the street, e.g., the length of time for a pedestrian to move about 4 meters on the street. In some embodiments, the sensor, e.g., a camera, detects a viewer, e.g., the user of the parking space or a pedestrian, who watches the advertising displayed on the sensor-enabled parking pay stations. In some embodiments, the sensor detects how long the viewer watches the displayed advertising. In some embodiments, the sensor detects whether the viewer stops watching the displayed advertising when the media display changes to a different advertising or when the viewer, e.g. a diver, stops filling up his vehicle. In some embodiments, the sensor detects the characteristics of or associated with the viewer/pedestrian, e.g., a facial picture of the viewer/pedestrian, the language used by the viewer/pedestrian, the vehicle driven by the viewer/pedestrian, the means to pay for the gas by the viewer/pedestrian, whether the viewer/pedestrian smokes, whether the viewer/pedestrian uses a Bluetooth device, etc. In some embodiments, the collection of the pedestrian data can be periodical, e.g., every ten minutes or hourly, during the peak time, e.g., during special events or rush hours, in real-time, upon a command by a manager, e.g., in an emergency. In some embodiments, the collected pedestrian data are communicated to one or more remote servers or to a cloud computing system or service. In some embodiments, the sensor that collects the pedestrian data is a vehicle sensor. In some embodiments, the sensor that collects the pedestrian data is a camera. In some embodiments, the sensor that collects the pedestrian data is a sound sensor. In some embodiments, the sensor that collects the pedestrian data is an environmental sensor.

In some embodiments, a sensor detecting or measuring the presence of a Bluetooth device, including a cell phone or smart phone, interacts with the detected Bluetooth device within a predetermined range of the parking pay station, e.g., within 10 meters. In some embodiments, the sensor detecting or measuring the presence of a Bluetooth device detects the number of Bluetooth devices within a predetermined range of the parking pay station, e.g., within 20 meters. In some embodiments, after the sensor detecting or measuring the presence of a Bluetooth device detects a Bluetooth device, the parking pay station interacts with the Bluetooth device, including a personal mobile device such as a cell phone or smart phone. In some embodiments, the personal mobile device is that of a parking user or that of a pedestrian/viewer who watches the advertising. In some embodiments, the parking pay station interacts with a detected Bluetooth device inside or associated with a vehicle, when the vehicle is parked in the proximity of the parking pay station or is driving within a predetermined range of the parking pay station, e.g., within 20 meters. In some embodiments, the parking pay station interacts with a detected Bluetooth device by sending information to or receiving information from the Bluetooth device.

In some embodiments, the data collected from one or more parking pay stations are combined and analyze to determine the reactions/behaviors of an average pedestrian/viewer after watching one or more pieces of advertisement. In further embodiments, the data collected from one or more parking pay stations are combined and analyze to determine which advertisement among a plurality of similar advertisements elicits more favorable response from an average pedestrian/viewer. In some embodiments, the data collected from one or more parking pay stations are combined and analyze to determine the ranking of popularity of a plurality of similar advertisements among average pedestrians/viewers. In some embodiments, the data collected from one or more parking pay stations are combined and analyze to determine or predict the possible preference for a pedestrian/viewer having one or more specific characteristics when watching a plurality of advertisements. In some embodiments, the data collected from one or more parking pay stations are combined and analyze to determine or predict which advertisement would elicit favorable response from a pedestrian/viewer having one or more specific characteristics when watching a plurality of advertisements. In some embodiments, the specific characteristics of a pedestrian/viewer are those that can be detected by one or more sensors of a parking pay station.

In some embodiments, the data collected from one or more parking pay stations are combined and analyzed to determine the appropriate parking rate for one or more parking lots. In some embodiments, the parking rate for one or more parking lots is determined based on the occupancy data, the traffic data, the pedestrian data, the data of detected Bluetooth, or a combination thereof. In some embodiments, the parking rate for one or more parking lots is determined based on predictions based on previously collected data. In some embodiments, the parking rate for one or more parking lots is determined based on predictions based on both previously collected data and currently collected data.

Media Selection

In some embodiments, the parking pay station media display caps, parking pay stations, parking pay station advertising platforms, and methods described herein include selection of media for a particular user, group of users, location, display screen, month, day, event, or the like. In some embodiments, media selection is performed at a parking pay station. In further embodiments, media selection is performed by selecting one or more media from a library of media stored at a parking pay station or a parking pay station media display cap. In other embodiments, media selection is performed at a centralized advertising application. In further embodiments, media selection is performed by selecting one or more media from a library of media stored at a parking pay station advertising platform or a centralized advertising application.

In some embodiments, media selection is based on financial data, such as a purchase history of an individual. In some embodiments, media selection is based on parking data, such as parking history of an individual. In further embodiments, financial data and/or parking data are used to identify a demographic characteristic of a parking user in proximity to a media display screen of the parking pay station and the media is selected based on the demographic characteristic of the parking user.

In some embodiments, media selection is based on sensor data, such as images or a video feed from a camera. In further embodiments, sensor data is used to identify an individual (by for example facial recognition technology) in proximity to a media display screen of the parking pay station and the media is selected based on a demographic characteristic of the individual.

In some embodiments, media selection is based on sensor data, such as images or a video feed from a camera, proximity sensor data, motion detector data, magnetometer data, and the like. In further embodiments, sensor data is used to identify an object and/or person in proximity to a media display screen of the parking pay station, such as a car, motorcycle, bicycle, or pedestrian, and the media is selected based on the object and/or person.

In some embodiments, media selection is based on sensor data, such as occupancy data of one or more parking lots, traffic data near one or more parking lots, traffic congestion data near or at one or more parking lots/intersections/streets, pedestrian data near or at one or more parking lots/intersections/streets, pedestrian data related to those who are watching the advertising, pedestrian data related to those who are walking towards or away from one or more parking pay stations/parking lots, detected Bluetooth device data, and information sent from detected Bluetooth devices.

Network Communications Element

In some embodiments, the network communications element includes a wireless radio transmitter. In further embodiments, a wireless radio transmitter suitably utilizes ISM band, Wi-Fi, Bluetooth, ZigBee, iBeacon, cellular (e.g., GSM, GPRS, EDGE, 2G, 2.5G, 3G, 4G, 5G, etc.), IEEE 802.15, WiMAX, or the like, to transmit information. In further embodiments, the network communications element includes a wireless radio transmitter configured to transmit sensor data, parking history data, parking user financial data, media, and the like.

Server

In some embodiments, the parking pay station media display caps, parking pay stations, parking pay station advertising platforms, and methods described herein include a processing device, such as one or more servers, or use of the same. In further embodiments, the processing device includes one or more hardware central processing units (CPUs) or general purpose graphics processing units (GPGPUs) that carry out the device's functions. In still further embodiments, the processing device further comprises an operating system configured to perform executable instructions. In some embodiments, the processing device is optionally connected to a computer network. In further embodiments, the processing device is optionally connected to the Internet such that it accesses the World Wide Web. In still further embodiments, the processing device is optionally connected to a cloud computing infrastructure. In other embodiments, the processing device is optionally connected to an intranet. In other embodiments, the processing device is optionally connected to a data storage device. In accordance with the description herein, suitable processing devices include, by way of non-limiting examples, server computers, desktop computers, laptop computers, and notebook computers.

In some embodiments, the processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the processing device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

Non-Transitory Computer Readable Storage Medium

In some embodiments, the parking pay station media display caps, parking pay stations, parking pay station advertising platforms, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the parking pay station media display caps, parking pay stations, parking pay station advertising platforms, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the parking pay station media display caps, parking pay stations, parking pay station advertising platforms, and methods disclosed herein include one or more databases, or use of the same. In view of the disclosure provided herein, those of skill in the art will recognize that many databases are suitable for storage and retrieval of parking history, parking user, location, sensor data, media, and advertising information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Methods for Meter Upgrades Using Media Display Cap

Described herein, in certain embodiments, are methods of upgrading a meter comprising: disengaging a cover housing from the housing base of an existing meter to expose an internal meter device; removing the cover housing; replacing the cover housing with a media display cap described in the present invention; and engaging the housing of the media display cap with the housing base to cover and enclose the meter device; provided that the media display cap comprising: a housing comprising a top and four sides forming an interior open at the bottom, at least one side of the housing comprising at least one transparent window; a network communications element configured to receive media via the network; and at least one media display screen positioned in the interior and visible through the window, the media display screen configured to display the media received via the network; thereby upgrading the existing parking pay station.

Described herein, in certain embodiments, are methods of upgrading a meter comprising: disengaging a portion of a cover housing from a cover housing of an existing meter; removing the portion of the cover housing; replacing the portion of the cover housing with a media display cap described in the present invention; and engaging the housing of the media display cap with the remainder of the cover housing base to cover and enclose the meter device; provided that an internal meter device of the existing meter is not replaced; provided that the portion of the cover housing replaced comprises less than 75%, 50%, or 25% of the cover housing; provided that the media display cap comprising: a housing comprising a top and four sides forming an interior open at the bottom, at least one side of the housing comprising at least one transparent window; a network communications element configured to receive media via the network; at least one media display screen positioned in the interior and visible through the window, the media display screen configured to display the media received via the network; and a power unit affixed to the media display cap, the power unit supplying power to the network communications element and the at least one media display screen; whereby the meter is upgraded.

The meter upgrade methods described herein generate minimal waste, reduce material and labor costs, and can be complete more quickly than current methods. Importantly, the meter upgrade methods described herein allow efficient secondary upgrades. In other words, the methods, in some embodiments, contemplate an upgrade to meter that was previously upgraded by retrofit of a new meter mechanism (e.g., replacement of the electronic mechanism within the base housing, with or without replacement of the cover housing).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A parking pay station advertising platform comprising:
 a) a plurality of upgraded parking pay stations, each upgraded parking pay station comprising:
  i) a network communications element configured to receive at least first media and second media via a network; wherein the first media and the second media are video;
  ii) a memory to store the first media and the second media;
  iii) a media display cap comprising:
   1) a housing comprising: a top and four sides forming an interior; a first transparent window in a first side of the housing; and a second transparent window in a second side of the housing;
   2) a first media display screen positioned in the interior and visible through the first window, the first media display screen configured to display the first media received via the network, wherein the first media display screen has a size of 7 inches or more in a diagonal direction; and 3) a second media display screen positioned in the interior and visible through the second window, the second media display screen configured to display the second media received via the network; and iv) an existing parking pay station;
wherein the media display cap is attached to the existing parking pay station, and wherein the existing parking pay station manages multiple parking spaces; and b) a server processor configured to provide a centralized advertising application comprising:

i) a software module identifying a parking user engaged with one of the upgraded parking pay stations;

ii) a software module determining the first media based on at least the identity of the parking user and transmitting the first media via the network to the one of the upgraded parking pay stations; and iii) a software module determining the second media based on at least the location of the one the upgraded pay stations and transmitting the second media via the network to the one of the upgraded parking pay stations.

2. The platform of claim 1, wherein the first media is displayed to the parking user on the first media display screen and the second media is displayed to pedestrians on the second media display screen.

3. The platform of claim 1, wherein each upgraded parking pay station further comprises one or more sensors, wherein the one or more sensors comprise a camera, a vehicle sensor, a pedestrian sensor, or a combination thereof.

4. The platform of claim 3, wherein the one or more sensors comprises a camera, the network communications element is further configured to transmit camera data via the network, and the centralized advertising application further comprises a software module performing biometric recognition on the camera data to determine the identity of the parking user.

5. The platform of claim 3, wherein the one or more sensors comprises a camera, the network communications element is further configured to transmit camera data via the network, the centralized advertising application further comprises a software module applying one or more computer vision algorithms to the camera data to determine one or more characteristics of at least one pedestrian, and the second media is further determined based on the one or more characteristics of the at least one pedestrian.

6. The platform of claim 3, wherein the one or more sensors comprises a camera, the network communications element is further configured to transmit camera data via the network, the centralized advertising application further comprises a software module applying one or more computer vision algorithms to the camera data to identify one or more objects, and the second media is further determined based on the identification of the one or more objects.

7. The platform of claim 3, wherein the one or more sensors comprises a vehicle sensor, and wherein the vehicle sensor comprises a radar, a time of flight sensor, a ranging sensor, a magnetic sensor, an ultrasonic sensor, an infrared sensor, a microwave sensor, or a magnetometer.

8. The platform of claim 1, wherein the media display cap further comprises an adapter on a bottom surface of the media display cap configured to interface between the media display cap and the existing parking pay station.

9. The platform of claim 8, wherein the adaptor is removable.

10. The platform of claim 1, wherein the media display cap further comprises one or more sensors.

11. The platform of claim 10, wherein the one or more sensors of the media display cap comprises a camera, a vehicle sensor, a pedestrian sensor, or a combination thereof.

12. The platform of claim 11, wherein the one or more sensors of the media display cap comprises a camera, the network communications element is further configured to transmit camera data via the network, and the centralized advertising application further comprises a software module performing biometric recognition on the camera data to determine the identity of the parking user.

13. The platform of claim 11, wherein the one or more sensors of the media display cap comprises a camera, the network communications element is further configured to transmit camera data via the network, the centralized advertising application further comprises a software module applying one or more computer vision algorithms to the camera data to determine one or more characteristics of at least one pedestrian, and the second media is further determined based on the one or more characteristics of the at least one pedestrian.

14. The platform of claim 11, wherein the one or more sensors of the media display cap comprises a camera, the network communications element is further configured to transmit camera data via the network, the centralized advertising application further comprises a software module applying one or more computer vision algorithms to the camera data to identify one or more objects, and the second media is further determined based on the identification of the one or more objects.

15. The platform of claim 11, wherein the one or more sensors of the media display cap comprises a vehicle sensor, and wherein the vehicle sensor comprises a radar, a time of flight sensor, a ranging sensor, a magnetic sensor, an ultrasonic sensor, an infrared sensor, a microwave sensor, or a magnetometer.

* * * * *